(12) United States Patent
Ding et al.

(10) Patent No.: US 12,451,041 B2
(45) Date of Patent: Oct. 21, 2025

(54) DISPLAY PANEL AND DISPLAY DEVICE

(71) Applicant: Xiamen Tianma Optoelectronics Co., Ltd., Xiamen (CN)

(72) Inventors: Zongcai Ding, Xiamen (CN); Xuhui Peng, Xiamen (CN); Weiqiang Wu, Xiamen (CN); Jie Lin, Xiamen (CN); Xiaohe Li, Xiamen (CN); Qiongqin Mao, Xiamen (CN)

(73) Assignee: Xiamen Tianma Optoelectronics Co., Ltd., Xiamen (CN)

( * ) Notice: Subject to any disclaimer, the term of this patent is extended or adjusted under 35 U.S.C. 154(b) by 0 days.

(21) Appl. No.: 18/924,244

(22) Filed: Oct. 23, 2024

(65) Prior Publication Data
US 2025/0046225 A1  Feb. 6, 2025

(30) Foreign Application Priority Data
Feb. 22, 2024  (CN) .......................... 202410199837.7

(51) Int. Cl.
*G09G 3/20* (2006.01)
*G06F 3/041* (2006.01)
*G11C 19/28* (2006.01)

(52) U.S. Cl.
CPC ........... *G09G 3/20* (2013.01); *G06F 3/04166* (2019.05); *G11C 19/28* (2013.01); *G09G 2310/0267* (2013.01); *G09G 2310/0286* (2013.01); *G09G 2354/00* (2013.01)

(58) Field of Classification Search
CPC ............. G09G 3/20; G09G 2310/0267; G09G 2310/0286; G09G 2354/00; G06F 3/04166; G11C 19/28
See application file for complete search history.

(56) References Cited

U.S. PATENT DOCUMENTS

| | | | | |
|---|---|---|---|---|
| 6,611,248 B2 * | 8/2003 | Kanbara | ................ | G11C 19/00 327/542 |
| 7,385,579 B2 * | 6/2008 | Satake | ................ | G09G 3/3648 345/97 |
| 7,432,737 B2 * | 10/2008 | Yoshida | ............... | G09G 3/3648 326/46 |

(Continued)

FOREIGN PATENT DOCUMENTS

| | | |
|---|---|---|
| CN | 107731187 B | 3/2020 |
| CN | 111812902 B | 4/2023 |

*Primary Examiner* — Sejoon Ahn
(74) *Attorney, Agent, or Firm* — KDW FIRM PLLC

(57) ABSTRACT

Provided display panel includes a first drive circuit including multiple shift registers. At least one shift register is a first-type shift register including pull-up unit, voltage storage unit, and first output unit. The pull-up unit is connected to first trigger terminal, first signal terminal, and first node. The voltage storage unit is connected to the first node, first clock terminal, second signal terminal, third signal terminal, fourth signal terminal, and second node. The first output unit is connected to the second node, the first clock terminal, and output terminal. During normal display scanning drive of the display panel, the display scanning drive can be interrupted when scanning to the first-type shift register, and the touch drive can be inserted and executed to realize the intra-frame touch drive which does not need to compress display time of one frame, has higher touch flexibility, facilitates improving touch effect and touch performance.

13 Claims, 13 Drawing Sheets

(56) References Cited

U.S. PATENT DOCUMENTS

| | | | | |
|---|---|---|---|---|
| 7,928,938 B2* | 4/2011 | Osame | ................ | G09G 3/2022 |
| | | | | 345/82 |
| 8,426,866 B2* | 4/2013 | Kimura | ................ | G09G 3/3291 |
| | | | | 257/296 |
| 12,154,482 B2* | 11/2024 | Sun | ........................ | G09G 3/32 |
| 12,167,649 B2* | 12/2024 | Kwak | ................ | G09G 3/3233 |
| 12,217,718 B2* | 2/2025 | Zhao | .................... | G09G 3/3607 |
| 2003/0189542 A1* | 10/2003 | Lee | .................... | G09G 3/3677 |
| | | | | 345/93 |
| 2007/0001954 A1* | 1/2007 | Shishido | ............. | G09G 3/3233 |
| | | | | 345/89 |

* cited by examiner

DISPLAY PANEL AND DISPLAY DEVICE

CROSS-REFERENCE TO RELATED APPLICATION(S)

This application claims priority to Chinese Patent Application No. 202410199837.7 filed Feb. 22, 2024, the disclosure of which is incorporated herein by reference in its entirety.

TECHNICAL FIELD

The present application relates to the field of display technology and, in particular, to a display panel and a display device.

BACKGROUND

With the continuous development of electronic technology, various types of displays have emerged. Accordingly, display technology also changes rapidly, for example, in-vehicle displays used in cars.

The existing display may integrate a touch function. However, the touch function is executed after the display time of a frame ends and before the display time of a next frame starts, and the touch performance is low.

SUMMARY

According to embodiments of the present application, a display panel is provided. The display panel includes a first drive circuit. The first drive circuit includes multiple shift registers. At least one shift register is a first-type shift register.

The first-type shift register includes a pull-up unit, a voltage storage unit, and a first output unit.

The pull-up unit is connected to a first trigger terminal, a first signal terminal, and a first node and is configured to, in response to the control of the first trigger terminal, adjust the signal of the first node according to the signal of the first signal terminal.

The voltage storage unit is connected to the first node, a first clock terminal, a second signal terminal, a third signal terminal, a fourth signal terminal, and a second node and is configured to, in response to the control of the first node and the control of the first clock terminal, adjust or store the signal of the second node according to the signal of the second signal terminal, the signal of the third signal terminal, and the signal of the fourth signal terminal.

The first output unit is connected to the second node, the first clock terminal, and an output terminal and is configured to, in response to the control of the second node, adjust the signal of the output terminal according to the signal of the first clock terminal.

According to embodiments of the present application, a display device is provided. The display device includes the preceding display panel.

According to the present application, a display panel is provided. The display panel includes a first drive circuit. The first drive circuit includes multiple shift registers. At least one shift register is a first-type shift register. The first-type shift register includes a pull-up unit, a voltage storage unit, and a first output unit.

The pull-up unit is connected to a first trigger terminal, a first signal terminal, and a first node.

The voltage storage unit includes a first transistor, a second transistor, a third transistor, a fourth transistor, and a first capacitor. The gate of the first transistor is connected to the first node. The first transistor is connected between the third signal terminal and the gate of the third transistor. The gate of the second transistor is connected to the first clock terminal. The second transistor is connected between the second signal terminal and the gate of the third transistor. The third transistor is connected between the fourth signal terminal and the gate of the fourth transistor. The fourth transistor is connected between the gate of the fourth transistor and the second node. The first capacitor is coupled between the gate of the third transistor and the gate of the fourth transistor.

The first output unit is connected to the second node, the first clock terminal, and the output terminal.

According to embodiments of the present application, a display panel is provided. The display panel includes a first drive circuit. The first drive circuit includes multiple shift registers. At least one shift register is a first-type shift register. The first-type shift register includes a pull-up unit, a voltage storage unit, and a first output unit.

The pull-up unit is connected to a first trigger terminal, a first signal terminal, and a first node.

The voltage storage unit includes a first transistor, a second transistor, a third transistor, a fourth transistor, and a first capacitor. The gate of the first transistor is connected to the first node. The first transistor is connected between the fourth signal terminal and the second node. The gate of the second transistor is connected to the first clock terminal. The second transistor is connected between the second signal terminal and the first node. The gate of the third transistor is connected to the third signal terminal. The third transistor is connected between the second node and a third node. The gate of the fourth transistor is connected to the first clock terminal. The fourth transistor is connected between the second signal terminal and the third node. The first capacitor is coupled between the third node and the first node.

The first output unit is connected to the second node, the first clock terminal, and the output terminal.

DETAILED DESCRIPTION

It is to be noted that terms such as "first" and "second" in the description, claims, and drawings of the present application are used for distinguishing between similar objects and are not necessarily used for describing a particular order or sequence. It is to be understood that the data used in this manner is interchangeable in appropriate cases so that the embodiments of the present application described herein can be implemented in an order not illustrated or described herein. In addition, the terms "including", "having", and any other variations thereof are intended to cover a non-exclusive inclusion. For example, a process, a method, a system, a product, or a device that includes a series of steps or units may include not only the expressly listed steps or units but also other steps or units that are not expressly listed or are inherent to the process, the method, the product, or the device.

Figure 1:
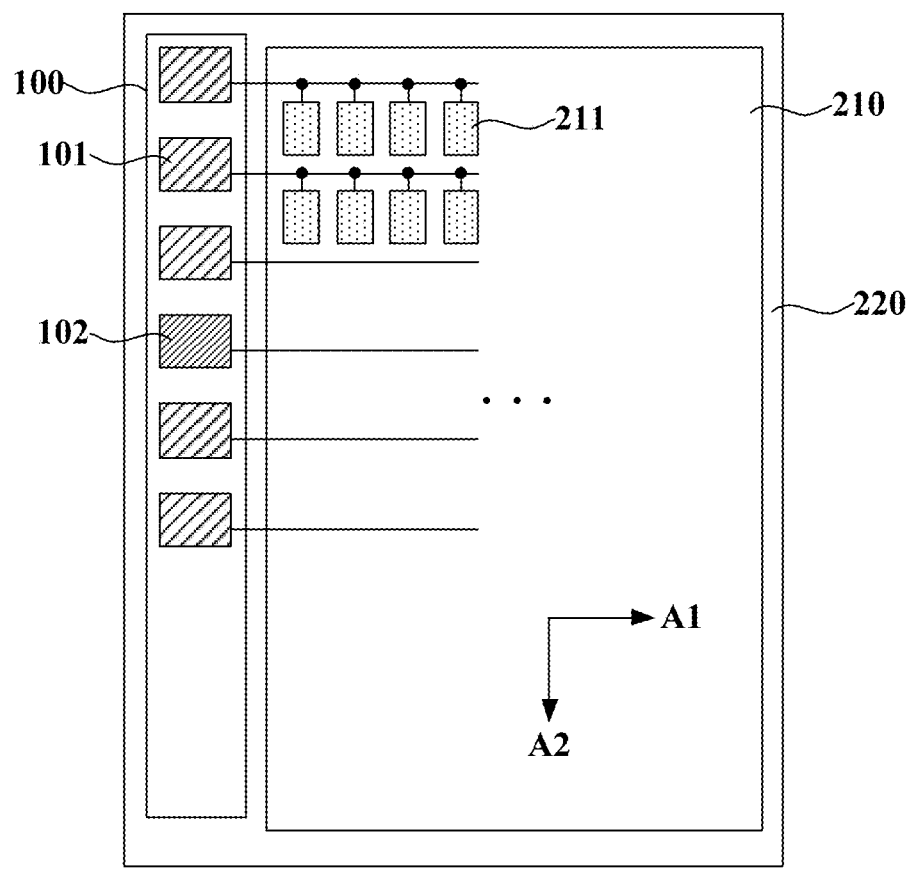
FIG. 1 is a schematic diagram of a display panel according to an embodiment of the present application.
Figure 2:
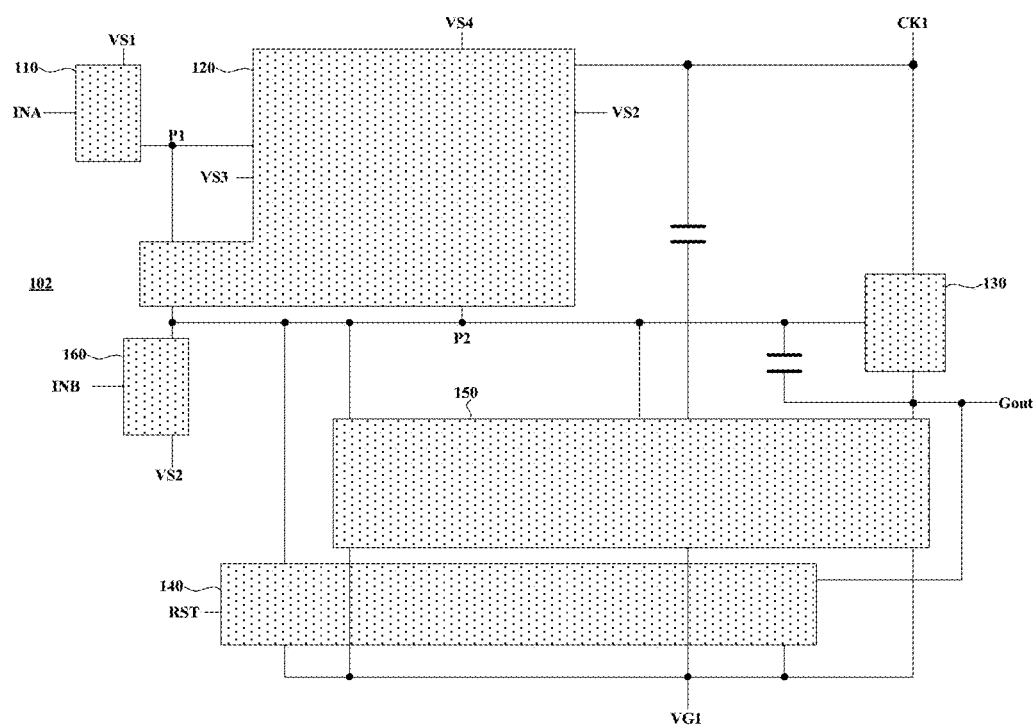
FIG. 2 is a schematic diagram of a first-type shift register according to an embodiment of the present application.

FIG. 1 is a schematic diagram of a display panel according to an embodiment of the present application. FIG. 2 is a schematic diagram of a first-type shift register according to an embodiment of the present application. As shown in FIGS. 1 and 2, the display panel includes a first drive circuit 100. The first drive circuit 100 includes multiple shift registers 101. At least one shift register 101 is a first-type shift register 102. The first-type shift register 102 includes a pull-up unit 110, a voltage storage unit 120, and a first output unit 130. The pull-up unit 110 is connected to a first trigger terminal INA, a first signal terminal VS1, and a first node P1 and is configured to, in response to the control of the first trigger terminal INA, adjust the signal of the first node P1 according to the signal of the first signal terminal VS1. The voltage storage unit 120 is connected to the first node P1, a first clock terminal CK1, a second signal terminal VS2, a third signal terminal VS3, a fourth signal terminal VS4, and a second node P2 and is configured to, in response to the control of the first node P1 and the control of the first clock terminal CK1, adjust the signal of the second node P2 or store the signal of the second node P2 according to the signal of the second signal terminal VS2, the signal of the third signal terminal VS3, and the signal of the fourth signal terminal VS4. The first output unit 130 is connected to the second node P2, the first clock terminal CK1, and an output terminal Gout and is configured to, in response to the control of the second node P2, adjust the signal of the output terminal Gout according to the signal of the first clock terminal CK1.

In this embodiment, the display panel includes a first region 210 and a second region 220. The first region 210 is configured to display. The first region 210 includes multiple sub-pixels 211. In one or more embodiments, the sub-pixels 211 in the first region 210 are arranged in an array. Multiple sub-pixels 211 are arranged in a first direction A1 to form a row of sub-pixels 211. Multiple sub-pixels 211 are arranged in a second direction A2 to form a column of sub-pixels 211. The first direction A1 and the second direction A2 intersect. However, the arrangement of the sub-pixels in the first region may be another arrangement and is not limited to an array arrangement. The second region 220 includes a circuit structure that drives the sub-pixels 211 in the first region 210 to display. In one or more embodiments, the second region 220 includes at least the first drive circuit 100. The first drive circuit 100 is configured to drive the sub-pixels 211 in the first region 210 to display. In one or more embodiments, the first region 210 of the display panel is the display region of the display panel, and the second region 220 is the non-display region of the display panel. A sub-pixel 211 in the display region may be an organic light-emitting display unit, or may be a micro light-emitting diode display unit, or may be other types of sub-pixels, which is not limited herein. The first drive circuit 100 in the non-display region is a gate driving circuit and is configured to control the sub-pixels 211 in the display region to perform progressive scanning.

The first drive circuit 100 includes multiple shift registers 101. A shift register 101 includes an output terminal Gout. A shift register 101 is electrically connected to one or more rows of sub-pixels 211 through the output terminal Gout. The shift register 101 provides a gate drive signal to the electrically connected sub-pixels 211 through the output terminal Gout. In FIG. 1, in one or more embodiments, a shift register 101 is electrically connected to a row of sub-pixels 211. The shift register 101 provides a gate drive signal to the corresponding row of sub-pixels 211. However, in one or more other embodiments, a shift register 101 is electrically connected to multiple rows of sub-pixels 211. The shift register 101 provides a gate drive signal to the multiple rows of sub-pixels at the same time.

For the first drive circuit 100, at least one shift register of the multiple shift registers 101 is a first-type shift register 102. The first-type shift register 102 outputs a gate drive signal through the output terminal Gout for driving sub-pixels 211 to work.

The first-type shift register 102 includes a pull-up unit 110. The pull-up unit 110 is connected to the first trigger terminal INA, the first signal terminal VS1, and the first node P1. In one or more embodiments, the control terminal of the pull-up unit 110 is connected to the first trigger terminal INA. The input terminal of the pull-up unit 110 is connected to the first signal terminal VS1. The output terminal of the pull-up unit 110 is connected to the first node P1. The pull-up unit 110 is switched to an ON state or an OFF state in response to the control of the first trigger terminal INA. When the signal provided by the first trigger terminal INA controls the pull-up unit 110 to be turned on, the signal provided by the first signal terminal VS1 is written into the first node P1. When the signal provided by the first trigger terminal INA controls the pull-up unit 110 to be turned off, the transmission path between the first signal terminal VS1 and the first node P1 is disconnected.

The first-type shift register 102 includes a voltage storage unit 120. The voltage storage unit 120 is connected to the first node P1, the first clock terminal CK1, the second signal terminal VS2, the third signal terminal VS3, the fourth signal terminal VS4, and the second node P2. The voltage storage unit 120 has two control terminals. One control terminal of the voltage storage unit 120 is connected to the first node P1, and the other control terminal of the voltage storage unit 120 is connected to the first clock terminal CK1. In response to the control of the first node P1 and the control of the first clock terminal CK1, the voltage storage unit 120 is switched to different operation states. The voltage storage unit 120 is also connected to the second signal terminal VS2, the third signal terminal VS3, the fourth signal terminal VS4, and the second node P2. The voltage storage unit 120 adjusts the signal of the second node P2 according to the signal of the second signal terminal VS2, the signal of the third signal terminal VS3, and the signal of the fourth signal terminal VS4. In one or more embodiments, in response to the control of the first node P1 and the control of the first clock terminal CK1, the voltage storage unit 120 stores the signal of the second node P2.

The first-type shift register 102 includes a first output unit 130. The first output unit 130 is connected to the second node P2, the first clock terminal CK1, and an output terminal Gout. In one or more embodiments, the control terminal of the first output unit 130 is connected to the second node P2. The input terminal of the first output unit 130 is connected to the first clock terminal CK1. The output terminal of the first output unit 130 is connected to the output terminal Gout. In response to the control of the second node P2, the first output unit 130 is switched to an ON state or an OFF state. When the signal provided by the second node P2 controls the first output unit 130 to be turned on, the signal provided by the first clock terminal CK1 is output through the output terminal Gout. When the signal provided by the second node P2 controls the first output unit 130 to be turned off, the transmission path between the first clock terminal CK1 and the output terminal Gout is disconnected. The signal provided by the first clock terminal CK1 is a voltage signal that alternates between high and low levels.

As shown in FIG. 2, in one or more embodiments, the first-type shift register 102 includes a first reset unit 140, a node control unit 150, and a pull-down unit 160. The first reset unit 140 is connected to a reset control terminal RST, a first power supply terminal VG1, the second node P2, and the output terminal Gout, and the first reset unit 140 is configured to, in response to the control of the reset control terminal RST, adjust the signal of the second node P2 and the signal of the output terminal Gout according to the signal of the first power supply terminal VG1. The node control unit 150 is connected to the second node P2, the first power supply terminal VG1, and the output terminal Gout, and the node control unit 150 is configured to, in response to the control of the second node P2, adjust the signal of the second node P2 and the signal of the output terminal Gout according to the signal of the first power supply terminal VG1. The pull-down unit 160 is connected to a second trigger terminal INB, the second signal terminal VS2, and the second node P2, and the pull-down unit 160 is configured to, in response to the control of the second trigger terminal INB, adjust the signal of the second node P2 according to the signal of the second signal terminal VS2.

The first-type shift register 102 includes a first reset unit 140. The first reset unit 140 is connected to the reset control terminal RST, the first power supply terminal VG1, the second node P2, and the output terminal Gout. In one or more embodiments, the control terminal of the first reset unit 140 is connected to the reset control terminal RST. The input terminal of the first reset unit 140 is connected to the first power supply terminal VG1. One signal output terminal of the first reset unit 140 is connected to the second node P2, and the other signal output terminal of the first reset unit 140 is connected to the output terminal Gout. In response to the control of the reset control terminal RST, the first reset unit 140 is switched to an ON state or an OFF state. When the signal provided by the reset control terminal RST controls the first reset unit 140 to be turned on, the signal provided by the first power supply terminal VG1 is written into the second node P2 and the second output terminal Gout. When the signal provided by the reset control terminal RST controls the first reset unit 140 to be turned off, the transmission path between the first power supply terminal VG1 and the second node P2 is disconnected, and the transmission path between the first power supply terminal VG1 and the output terminal Gout is disconnected.

The first-type shift register 102 includes a node control unit 150. The node control unit 150 is connected to the second node P2, the first power supply terminal VG1, and the output terminal Gout. In one or more embodiments, the control terminal of the node control unit 150 is connected to the second node P2. The input terminal of the node control unit 150 is connected to the first power supply terminal VG1. The signal output terminal of the node control unit 150 is connected to at least the output terminal Gout. In response to the control of the second node P2, the node control unit 150 is switched to an ON state or an OFF state. When the signal provided by the second node P2 controls the node control unit 150 to be turned on, the signal provided by the first power supply terminal VG1 is written into the second node P2 and the second output terminal Gout. When the signal provided by the second node P2 controls the node control unit 150 to be turned off, the transmission path between the first power supply terminal VG1 and the second node P2 is disconnected, and the transmission path between the first power supply terminal VG1 and the output terminal Gout is disconnected.

The first-type shift register 102 includes a pull-down unit 160. The pull-down unit 160 is connected to the second trigger terminal INB, the second signal terminal VS2, and the second node P2. The control terminal of the pull-down unit 160 is connected to the second trigger terminal INB. The input terminal of the pull-down unit 160 is connected to the second signal terminal VS2. The output terminal of the pull-down unit 160 is connected to the second node P2. In response to the control of the second trigger terminal INB, the pull-down unit 160 is switched to an ON state or an OFF state. When the signal provided by the second trigger terminal INB controls the pull-down unit 160 to be turned on, the signal provided by the second signal terminal VS2 is written into the second node P2. When the signal provided by the second trigger terminal INB controls the pull-down unit 160 to be turned off, the transmission path between the second signal terminal VS2 and the second node P2 is disconnected.

In this embodiment, the display panel may perform normal display scanning drive or may perform intra-frame touch drive in the display scanning drive process.

The display panel performs normal display scanning drive. Multiple shift registers 101 in the first drive circuit 100 perform display scanning drive, so that the sub-pixels 211 in the display region may be controlled to perform progressive scanning. In this case, the first-type shift register 102 performs normal display scanning drive. The output terminal Gout of the first-type shift register 102 outputs a normal gate drive signal. When the display panel scans to the first-type shift register 102, the voltage storage unit 120 stores the signal of the second node P2, but does not affect the signal of the second node P2. That is, the voltage storage unit 120 may be considered as being in an OFF state. In response to the control of the second node P2, the first output unit 130 is switched to an ON state or an OFF state. When the first output unit 130 is turned on, the signal provided by the first clock terminal CK1 is output through the output terminal Gout. In one or more embodiments, in a case where the signal provided by the first clock terminal CK1 is a high level, the output terminal Gout of the first-type shift register 102 outputs a high-level signal. In a case where the signal provided by the first clock terminal CK1 is a low level, the output terminal Gout of the first-type shift register 102 outputs a low-level signal. In this manner, the display scanning drive of the display panel are implemented. In this process, the added voltage storage unit 120 does not affect the display scanning drive operation of the display panel, and the voltage storage unit 120 may be understood as being in an OFF state, thereby ensuring that the display scanning drive operation of the display panel is normally and stably performed.

The display panel performs intra-frame touch drive. Multiple shift registers 101 in the first drive circuit 100 perform display scanning drive. When the display panel scans to the first-type shift register 102, display scanning drive are suspended, and the touch drive are started. In one or more embodiments, when the display panel scans to the first-type shift register 102, the voltage storage unit 120 is configured to store the charge of the second node P2. The current charge of the second node P2 is a charge that can enable a shift register to perform display scanning drive. The display scanning drive of the first-type shift register 102 are controlled to be interrupted, and the touch drive are started and executed. After the touch drive ends, the charge stored in the voltage storage unit 120 for starting a shift register is written into the second node P2, so that the signal of the output terminal Gout after the touch drive ends is the same as the signal of the output terminal Gout before the touch drive starts. The first-type shift register 102 continues to perform gate output. The display panel continues to perform normal display scanning drive, and the voltage storage unit 120 is switched to an OFF state again, which does not affect the normal operation of a shift register.

In the present application, when the display panel performs normal display scanning drive, and the display panel scans to the first-type shift register, the display scanning drive is interrupted, touch drive is inserted and executed, and intra-frame touch drive is implemented. Compared with the existing touch drive that are performed between two frames of display, the intra-frame touch drive does not need to compress display time of one frame, and the touch flexibility is high. Thus, the touch effect can be improved, and the touch performance can be improved. In one or more embodiments, in a case where the intra-frame touch drive needs to be performed, when the display panel scans to the first-type shift register, the voltage storage unit may store the signal of the second node. Then, the gate output of the first-type shift register is controlled to be interrupted, and touch drive is inserted. After the touch drive ends, the signal of the second node stored in the voltage storage unit in the first-type shift register is written into the second node to drive the first output unit to continue to perform gate output. The display panel continues to perform display scanning drive, and intra-frame touch drive is implemented, thereby improving the touch performance.

Figure 3:
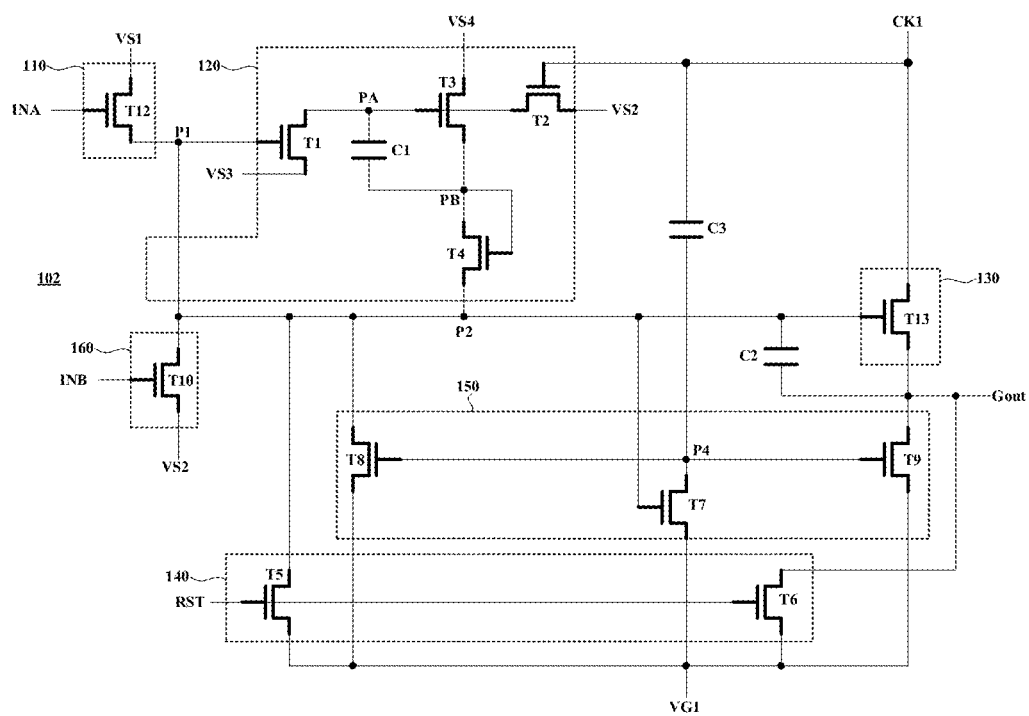
FIG. 3 is a schematic diagram of another first-type shift register according to an embodiment of the present application.

FIG. 3 is a schematic diagram of another first-type shift register according to an embodiment of the present application. As shown in FIG. 3, in one or more embodiments, the voltage storage unit 120 includes a first transistor T1, a second transistor T2, a third transistor T3, a fourth transistor T4, and a first capacitor C1. The gate of the first transistor T1 is connected to the first node P1. The first transistor T1 is connected between the third signal terminal VS3 and the gate of the third transistor T3. The gate of the second transistor T2 is connected to the first clock terminal CK1.

The second transistor T2 is connected between the second signal terminal VS2 and the gate of the third transistor T3. The third transistor T3 is connected between the fourth signal terminal VS4 and the gate of the fourth transistor T4. The fourth transistor T4 is connected between the gate of the fourth transistor T4 and the second node P2. The first capacitor C1 is coupled between the gate of the third transistor T3 and the gate of the fourth transistor T4. In one or more embodiments, the first node P1 is connected to the second node P2. In one or more embodiments, the first-type shift register 102 includes multiple transistors. The multiple transistors are all N-type transistors. In one or more embodiments, the multiple transistors are all P-type transistors. As shown in FIG. 3, in one or more embodiments, all transistors in the first-type shift register 102 are N-type transistors.

In this embodiment, the voltage storage unit 120 is in a 4T1C structure. In one or more embodiments, the voltage storage unit 120 includes a first transistor T1, a second transistor T2, a third transistor T3, a fourth transistor T4, and a first capacitor C1.

The gate of the first transistor T1 is connected to the first node P1. A first terminal of the first transistor T1 is connected to the third signal terminal VS3. A second terminal of the first transistor T1 is connected to a node PA. The node PA is connected to the gate of the third transistor T3. In response to the control of the first node P1, the first transistor T1 is switched to an ON state or an OFF state. In one or more embodiments, the first transistor T1 is an N-type. When the signal provided by the first node P1 is a high level, the first transistor T1 is turned on. The signal provided by the third signal terminal VS3 is written into the node PA. When the signal provided by the first node P1 is a low level, the first transistor T1 is turned off. In one or more other embodiments, the first transistor T1 is a P-type.

The gate of the second transistor T2 is connected to the first clock terminal CK1. A first terminal of the second transistor T2 is connected to the second signal terminal VS2. A second terminal of the second transistor T2 is connected to a node PA. In response to the control of the first clock terminal CK1, the second transistor T2 is switched to an ON state or an OFF state. In one or more embodiments, the second transistor T2 is an N-type. When the signal provided by the first clock terminal CK1 is a high level, the second transistor T2 is turned on. The signal provided by the second signal terminal VS2 is written into the node PA. When the signal provided by the first clock terminal CK1 is a low level, the second transistor T2 is turned off. In one or more other embodiments, the second transistor is a P-type.

The gate of the third transistor T3 is connected to the node PA. A first terminal of the third transistor T3 is connected to the fourth signal terminal VS4. A second terminal of the third transistor T3 is connected to a node PB. The node PB is connected to the gate of the fourth transistor T4. In response to the control of the node PA, the third transistor T3 is switched to an ON state or an OFF state. In one or more embodiments, the third transistor T3 is an N-type. When the signal provided by the node PA is a high level, the third transistor T3 is turned on. The signal provided by the fourth signal terminal VS4 is written into the node PB. When the signal provided by the node PA is a low level, the third transistor T3 is turned off. In one or more other embodiments, the third transistor is a P-type.

The gate of the fourth transistor T4 is connected to the node PB. A first terminal of the fourth transistor T4 is connected to the node PB. A second terminal of the fourth transistor T4 is connected to the second node P2. In response to the control of the node PB, the fourth transistor T4 is switched to an ON state or an OFF state. In one or more embodiments, the fourth transistor T4 is an N-type. When the signal provided by the node PB is a high level, the fourth transistor T4 is turned on. The high-level signal provided by the node PB is written into the second node P2. When the signal provided by the node PB is a low level, the fourth transistor T4 is turned off. In one or more other embodiments, the fourth transistor is a P-type.

The first capacitor C1 is coupled between node PA and node PB. When the node PA is in a floating state, the potential variation of the node PB affects the potential variation of the node PA. Similarly, when the node PB is in a floating state, the potential variation of the node PA affects the potential variation of the node PB.

As shown in FIG. 3, in one or more embodiments, the first-type shift register 102 includes a first reset unit 140, a node control unit 150, and a pull-down unit 160. The first reset unit 140 includes a fifth transistor T5 and a sixth transistor T6. The gate of the fifth transistor T5 is connected to the reset control terminal RST. The fifth transistor T5 is connected between the first power supply terminal VG1 and the second node P2. The gate of the sixth transistor T6 is connected to the reset control terminal RST. The sixth transistor T6 is connected between the first power supply terminal VG1 and the output terminal Gout. The node control unit 150 includes a seventh transistor T7, an eighth transistor T8, and a ninth transistor T9. The gate of the seventh transistor T7 is connected to the second node P2. The seventh transistor T7 is connected to the first power supply terminal VG1 and a fourth node P4. The gate of the eighth transistor T8 is connected to the fourth node P4. The eighth transistor T8 is connected between the first power supply terminal VG1 and the second node P2. The gate of the ninth transistor T9 is connected to the fourth node P4. The ninth transistor T9 is connected between the first power supply terminal VG1 and the output terminal Gout. The pull-down unit 160 includes a tenth transistor T10. The gate of the tenth transistor T10 is connected to the second trigger terminal INB. The tenth transistor T10 is connected between the second signal terminal VS2 and the second node P2. The first-type shift register 102 also includes a second capacitor C2 and a third capacitor C3. The second capacitor C2 is coupled between the second node P2 and the output terminal Gout. The third capacitor C3 is coupled between the first clock terminal CK1 and the fourth node P4.

In this embodiment, in one or more embodiments, the fifth transistor T5, the sixth transistor T6, the seventh transistor T7, the eighth transistor T8, the ninth transistor T9, and the tenth transistor T10 are all N-types. In any one of the fifth transistor T5, the sixth transistor T6, the seventh transistor T7, the eighth transistor T8, the ninth transistor T9, or the tenth transistor T10, when the signal received by the gate is a high level, the corresponding transistor is controlled to be turned on; and when the signal received by the gate is a low level, the corresponding transistor is controlled to be turned off. In one or more other embodiments, the fifth transistor T5, the sixth transistor T6, the seventh transistor T7, the eighth transistor T8, the ninth transistor T9, and the tenth transistor T10 are all P-types. In one or more embodiments, at least one of the fifth transistor T5, the sixth transistor T6, the seventh transistor T7, the eighth transistor T8, the ninth transistor T9, or the tenth transistor T10 is a P-type, or at least one of the fifth transistor T5, the sixth transistor T6, the seventh transistor T7, the eighth transistor T8, the ninth transistor T9, or the tenth transistor T10 is an N-type.

As shown in FIG. 3, in one or more embodiments, the pull-up unit 110 includes a twelfth transistor T12. The gate of the twelfth transistor T12 is connected to the first trigger terminal INA. The twelfth transistor T12 is connected between the first signal terminal VS1 and the first node P1. The first output unit 130 includes a thirteenth transistor T13. The gate of the thirteenth transistor T13 is connected to the second node P2. The thirteenth transistor T13 is connected between the first clock terminal CK1 and the output terminal Gout.

In this embodiment, in one or more embodiments, each of the twelfth transistor T12 and the thirteenth transistor T13 is an N-type. In any one of the twelfth transistor T12 or the thirteenth transistor T13, when the signal received by the gate is a high level, the corresponding transistor is controlled to be turned on; and when the signal received by the gate is a low level, the corresponding transistor is controlled to be turned off. In one or more other embodiments, the twelfth transistor and the thirteenth transistor are P-types. In one or more embodiments, one of the twelfth transistor and the thirteenth transistor is a P-type, and the other is an N-type.

In one or more embodiments, the electrical signal provided by the third signal terminal VS3 contains a high and low level transition, and the high and low level transition is used to control the voltage storage unit 120 to be in the ON state or the OFF state.

Figure 4:
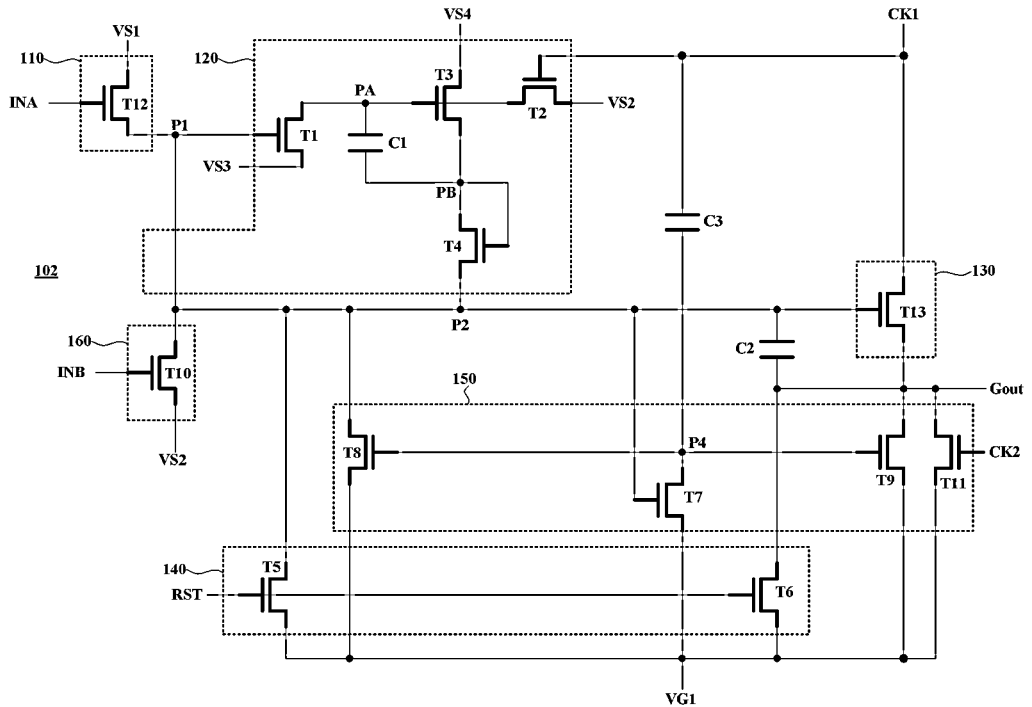
FIG. 4 is a schematic diagram of another first-type shift register according to an embodiment of the present application.

FIG. 4 is a schematic diagram of another first-type shift register according to an embodiment of the present application. The first-type shift register shown in FIG. 4 is different from the first-type shift register shown in FIG. 3. The difference in FIG. 4 is that the node control unit 150 also includes an eleventh transistor T11. The gate of the eleventh transistor T11 is connected to a second clock terminal CK2. The eleventh transistor T11 is connected between the first power supply terminal VG1 and the output terminal Gout. In this embodiment, the eleventh transistor T11 is an N-type. When the signal provided by the second clock terminal CK2 is a high level, the eleventh transistor T11 is turned on. When the signal provided by the second clock terminal CK2 is a low level, the eleventh transistor T11 is turned off. In one or more other embodiments, the eleventh transistor is a P-type.

In this embodiment, the first-type shift register shown in FIG. 4 is used as an example to describe the operation process of the first-type shift register. In one or more embodiments, the first signal terminal VS1 provides a high-level signal VGH, and the second signal terminal VS2 provides a low-level signal VGL. In one or more embodiments, the electrical signal provided by the fourth signal terminal VS4 includes a high and low level transition. The signal provided by the third signal terminal VS3 is different from the signal provided by the fourth signal terminal VS4. In one or more embodiments, the first clock terminal CK1 provides a first clock signal, and the second clock terminal CK2 provides a second clock signal. The first clock signal is different from the second clock signal. The first clock signal is a signal that alternates between high and low levels. The second clock signal is a signal that alternates between high and low levels.

Figure 5:
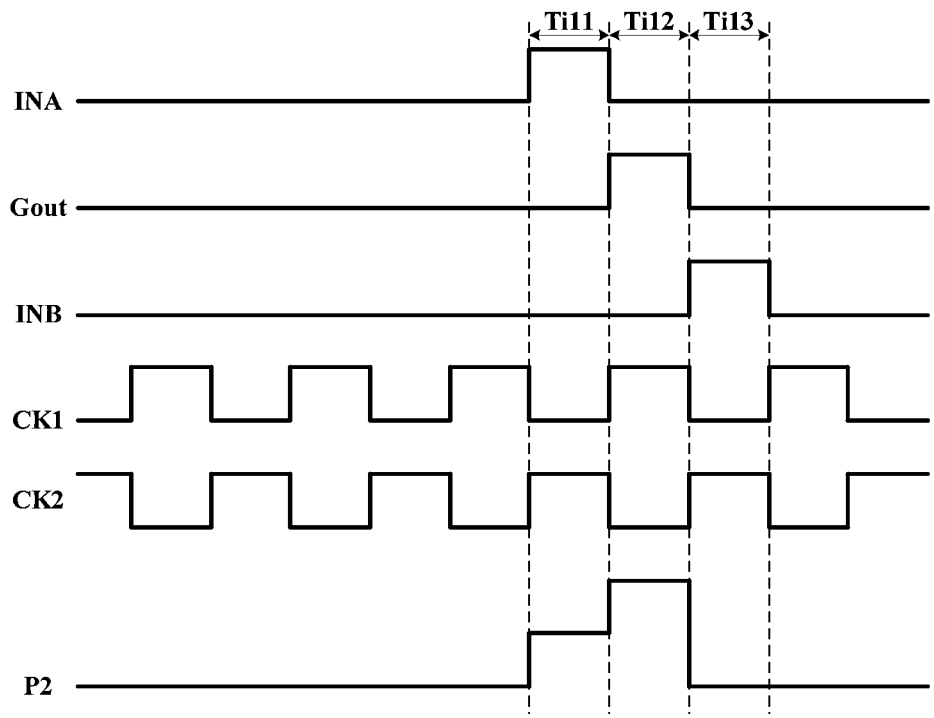
FIG. 5 is a schematic timing diagram for performing scanning drive by a first-type shift register shown in FIG. 4.

The display panel performs display scanning drive. When the display panel scans to the first-type shift register 102, in a case where the touch drive is not started, the first-type shift register 102 performs normal gate output. The output terminal Gout of the first-type shift register 102 outputs a normal gate drive signal. FIG. 5 is a schematic timing diagram for performing scanning drive by a first-type shift register shown in FIG. 4. Referring to FIGS. 4 and 5, the operation process of the first-type shift register includes at least the stages below.

In a first stage Ti11, the first trigger terminal INA of the first-type shift register 102 receives a high-level signal, so that the twelfth transistor T12 is turned on. The high-level signal provided by the first signal terminal VS1 is written into the second node P2, so that the thirteenth transistor T13 is turned on. The low-level signal provided by the first clock CK1 is written into the output terminal Gout. The high-level signal provided by the second clock terminal CK2 enables the eleventh transistor T11 to be turned on. The low-level signal provided by the first power supply terminal VG1 is written into the output terminal Gout.

In a second stage Ti12, the first trigger terminal INA of the first-type shift register 102 receives a low-level signal, so that the twelfth transistor T12 is turned off. The second node P2 maintains a high-level signal, so that the thirteenth transistor T13 is kept on. The high-level signal provided by the first clock CK1 is written into the output terminal Gout. The high-level signal of the output terminal Gout is coupled through the second capacitor C2, so that the second node P2 is raised based on the bootstrap function of the second capacitor C2. The low-level signal provided by the second clock terminal CK2 enables the eleventh transistor T11 to be turned off.

In a third stage Ti13, the second trigger terminal INB of the first-type shift register 102 receives a high-level signal, so that the tenth transistor T10 is turned on. The low-level signal provided by the second signal terminal VS2 is written into the second node P2, so that the thirteenth transistor T13 is turned off. The high-level signal provided by the second clock terminal CK2 enables the eleventh transistor T11 to be turned on. The low-level signal provided by the first power supply terminal VG1 is written into the output terminal Gout.

As described above, the first-type shift register 102 outputs a high-level signal in the second stage Ti12. The high-level signal is an effective pulse signal for performing display scanning drive on the sub-pixels of the corresponding row. The first-type shift register 102 keeps outputting a low-level signal in the third stage Ti13 and thereafter until the first trigger terminal INA receives a high-level signal again.

Figure 6:
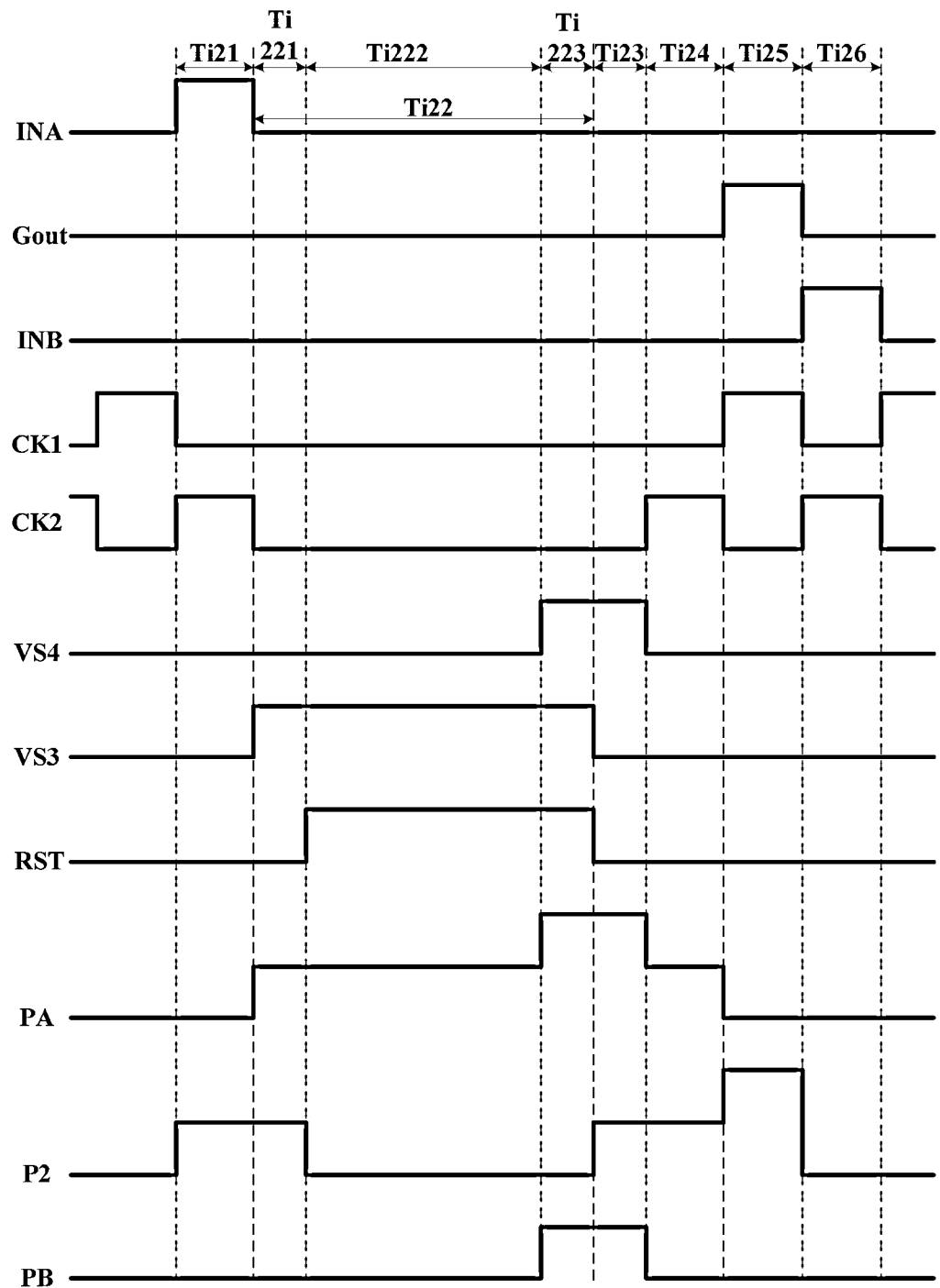
FIG. 6 is a schematic timing diagram for performing intra-frame touching by a first-type shift register shown in FIG. 4.

The display panel performs display scanning drive. In a case where the intra-frame touching drive needs to be performed, when the display panel scans to the first-type shift register, the display scanning drive of the first-type shift register 102 is suspended, and the touch drive is started. In the touch stage, the first clock terminal CK1 and the second clock terminal CK2 do not provide normal waveforms. In one or more embodiments, the first clock terminal CK1 and the second clock terminal CK2 provide low-level signals. FIG. 6 is a schematic timing diagram for performing intra-frame touching by a first-type shift register shown in FIG. 4. Referring to FIGS. 4 and 6, the operation process of the first-type shift register includes at least the stages below.

In the first stage Ti21, the first trigger terminal INA of the first-type shift register 102 receives a high-level signal, so that the twelfth transistor T12 is turned on. The high-level signal provided by the first signal terminal VS1 is written into the second node P2, so that the thirteenth transistor T13 and the first transistor T1 are turned on. The low-level signal provided by the first clock CK1 is written into the output terminal Gout. The low-level signal provided by the third signal terminal VS3 is written into the node PA. The high-level signal provided by the second clock terminal CK2 enables the eleventh transistor T11 to be turned on. The low-level signal provided by the first power supply terminal VG1 is written into the output terminal Gout.

In the second stage Ti22, the first-type shift register 102 enters a touch stage. In one or more embodiments, the first clock terminal CK1 and the second clock terminal CK2 provide low-level signals. The first trigger terminal INA of the first-type shift register 102 receives a low-level signal, so that the twelfth transistor T12 is turned off, and the output terminal Gout keeps a low-level signal. The second stage Ti22 includes a first sub-stage Ti221, a second sub-stage Ti222, and a third sub-stage Ti223.

In the first sub-stage Ti221, the third signal terminal VS3 provides a high-level signal VGH. In this case, the first transistor T1 maintains in an ON state based on the high-level signal of the second node P2. The high-level signal provided by the third signal terminal VS3 is written to the node PA through the first transistor T1. The node PA is in a high level (VGH), so that the third transistor T3 is turned on. The low-level signal provided by the fourth signal terminal VS4 is written into the node PB, so that the fourth transistor T4 is turned off. It is to be understood that when the second node P2 is in a high-level signal, the first-type shift register 102 may be started. Thus, in this stage, the high-level signal written to the node PA may be understood as a potential that stores the second node P2 and may be used for enabling the first-type shift register 102 to perform display scanning drive. In one or more embodiments, the high-level signal written to the node PA is stored in the first capacitor C1.

In the second sub-stage Ti222, the reset control terminal RST provides a high-level signal VGH, so that the fifth transistor T5 and the sixth transistor T6 are turned on, and the low-level signal provided by the first power supply terminal VG1 is written into the second node P2 and the second output terminal Gout. The thirteenth transistor T13 and the first transistor T1 are turned off. The node PA maintains a high level VGH. It is to be understood that the thirteenth transistor T13 is turned off, that is, Vgs=0. In this case, the bias voltage time of the first-type shift register 102 is consistent with the bias voltage time of other shift registers, which may avoid display horizontal stripes caused by inconsistent threshold voltages Vth caused by inconsistent bias voltage time of different shift registers, thereby improving the display effect. In this case, the high level kept by the node PA, that is, a VGH charge, is a VGH charge used for starting the first-type shift register 102.

In the third sub-stage Ti223, the reset control terminal RST keeps a high-level signal VGH, so that the second node P2 and the output terminal Gout keep outputting low-level signals. The fourth signal terminal VS4 provides a high-level signal VGH. In this case, the third transistor T3 maintains an ON state based on the high-level signal of the node PA, so that the high-level signal provided by the fourth signal terminal VS4 is written to the node PB through the third transistor T3. The high-level signal of the node PB is coupled through the first capacitor C1, so that the node PA is raised based on the bootstrap function of the first capacitor C1. It is ensured that the on amplitude of the third transistor T3 is large enough, so that the node PB is gradually charged to a high level.

In the third stage Ti23, the touch stage of the first-type shift register 102 ends. In one or more embodiments, the reset control terminal RST provides a low-level signal VGH, so that the fifth transistor T5 and the sixth transistor T6 are turned off. The high-level signal provided by the fourth signal terminal VS4 continuously charges the node PB, so that the fourth transistor T4 is turned on. The high-level signal provided by the fourth signal terminal VS4 is written into the second node P2, so that the second node P2 is charged to a high level. Since the potential of the node PA is higher than the potential of the second node P2, the first transistor T1 is kept off. After the touch stage ends, the high level, that is, the VGH charge, is written into the second node P2. It is to be understood that the VGH charge stored in the voltage storage unit 120 for starting the first-type shift register 102 is written into the second node P2.

In a fourth stage Ti24, the second node P2 is charged to a high level and may drive the thirteenth transistor T13 to be turned on. The low-level signal provided by the first clock CK1 is written into the output terminal Gout. The first transistor T1 is kept off. The low-level signal provided by the fourth signal terminal VS4 is written into the node PB. The low-level signal of the node PB enables the fourth transistor T4 to be turned off. The low-level signal of the node PB is coupled through the first capacitor C1, so that the node PA is pulled down. The high-level signal provided by the second clock terminal CK2 enables the eleventh transistor T11 to be turned on. The low-level signal provided by the first power supply terminal VG1 is written into the output terminal Gout.

In a fifth stage Ti25, the first clock terminal CK1 and the second clock terminal CK2 provide normal waveforms. In one or more embodiments, the high level of the second node P2 enables the thirteenth transistor T13 to be turned on. The high-level signal provided by the first clock CK1 is written into the output terminal Gout. The first-type shift register 102 starts to perform display scanning drive. In this case, the high-level signal output by the output terminal Gout is an effective pulse. The high-level signal of the output terminal Gout is coupled through the second capacitor C2, so that the potential of the second node P2 is raised, and it is ensured that the thirteenth transistor T13 is in an ON state. The second transistor T2 is turned on. The low-level signal provided by the second signal terminal VS2 is written into the node PA. Thus, after touch drive is completed, the first-type shift register 102 performs normal display scanning drive.

In the sixth stage Ti26, the second trigger terminal INB of the first-type shift register 102 receives a high-level signal, so that the tenth transistor T10 is turned on. The low-level signal provided by the second signal terminal VS2 is written into the second node P2, so that the thirteenth transistor T13 is turned off. The high-level signal provided by the second clock terminal CK2 enables the eleventh transistor T11 to be turned on. The low-level signal provided by the first power supply terminal VG1 is written into the output terminal Gout.

As described above, the first trigger terminal INA of the first-type shift register 102 receives a high-level signal, which indicates that the display panel scans to the first-type shift register 102. The voltage storage unit 120 of the first-type shift register 102 in the first sub-stage Ti221 of the stage Ti22 is configured to store the VGH charge that starts the shift register. In one or more embodiments, the VGH charge that starts the shift register is stored in the node PA of the voltage storage unit 120.

From the second stage Ti22 to the fourth stage Ti24, the output terminal Gout of the first-type shift register 102 outputs a low-level signal, and the display scanning drive is interrupted. In Ti22 stage, touch timing may be inserted into the display panel to implement intra-frame touch. From Ti23 to Ti24 stage, the touch stage ends, and the transition from the touch drive to the display scanning drive is performed, so that the voltage storage unit 120 writes the high-level signal provided by the fourth signal terminal VS4 into the second node P2. It is to be understood that the VGH charge used for starting the shift register is written into the second node P2.

In the fifth stage Ti25, the first clock terminal CK1 and the second clock terminal CK2 provide normal clock signals. The first-type shift register 102 continues to perform display scanning drive. The output terminal Gout outputs a high-level signal for display scanning drive the sub-pixels of the corresponding row. The display panel continues to perform display scanning drive. After the fifth stage Ti25, the output terminal Gout outputs a low-level signal until the first trigger terminal INA receives a high-level signal again.

Based on this, when the display panel scans to the first-type shift register, the display panel may pause display scanning drive to start touch drive. The voltage storage unit of the first-type shift register is configured to store the VGH charge that starts a shift register. After the touch stage ends, the voltage storage unit of the first-type shift register writes the VGH charge that starts the shift register into the second node and drives the shift register to work normally.

It is to be understood that any shift register in the first drive circuit is the first-type shift register, so that the display scanning drive may be interrupted at any scanning position of the display panel, and touch drive is inserted and executed. In a case where part of the shift registers in the first drive circuit are first-type shift registers, the display scanning drive may be interrupted at the scanning position corresponding to the first-type shift register, and touch drive is inserted and executed.

The voltage storage unit of the first-type shift register is configured to store the VGH charge that starts a shift register, so that the signal of the output terminal Gout after the touch stage ends is consistent with the signal of the output terminal Gout before the touch stage starts.

It is to be noted that the charge used for starting the shift register may be a VGH charge or a VGL charge. Based on the shift register structure shown in FIG. 4, in one or more embodiments, the charge used for starting the shift register is a VGH charge. When the charge used for starting the shift register is a VGL charge, the structure of the display panel or the structure of the shift register may be changed accordingly to satisfy usage requirements.

According to the display panel provided in this embodiment, a voltage storage unit 120 is added to the first-type shift register 102. Based on this, touch drive is inserted at the scanning position of the first-type shift register 102, so that a horizontal stripe may be prevented from being generated. Regarding how to improve the touch performance, it was once considered to insert a touch stage into display time of a frame. However, it was found that in this way, horizontal stripes of a display screen and even a partial black screen may be caused.

Figure 7:
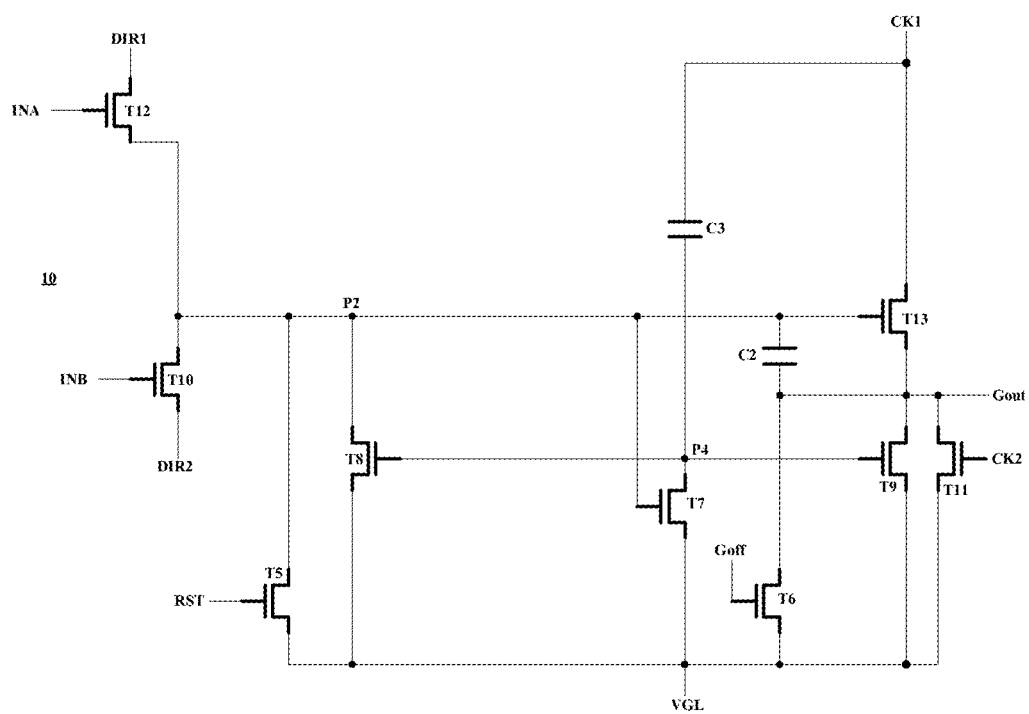
FIG. 7 is a schematic diagram of an improved shift register based on a conventional shift register.

In one or more embodiments, FIG. 7 is a schematic diagram of an improved shift register based on a conventional shift register. As shown in FIG. 7, compared with the first-type shift register 102, no voltage storage unit is arranged in the improved shift register 10, and the gate of the sixth transistor T6 in the improved shift register 10 is connected to the signal port Goff. The signal port Goff is set according to the present application to pause the improved shift register to implement the insertion of a touch stage.

Figure 8:
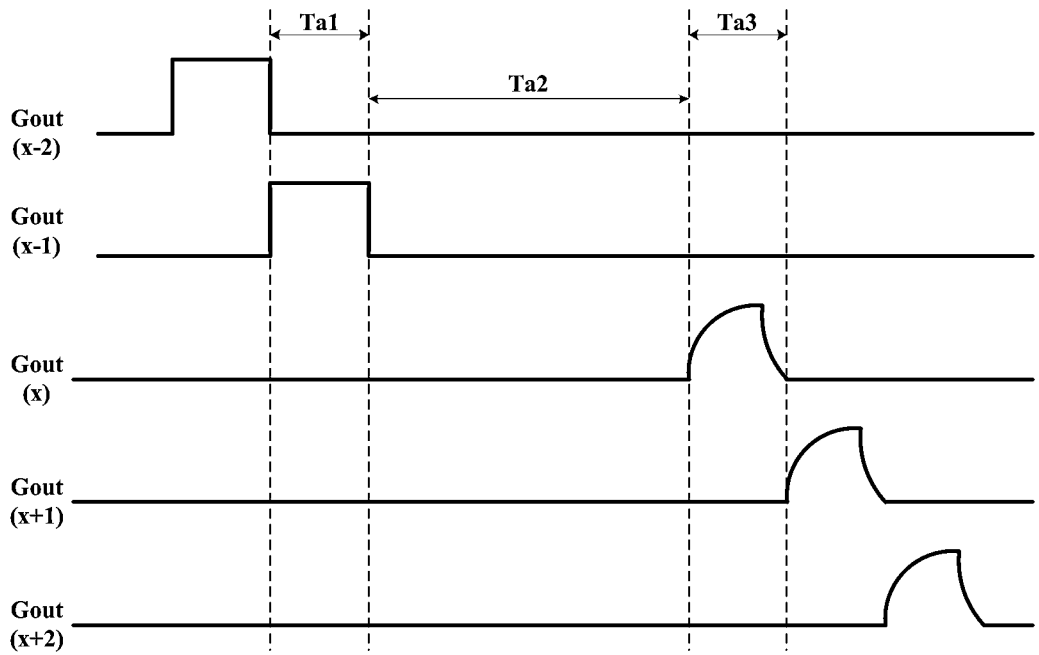
FIG. 8 is a schematic timing diagram of multiple shift registers based on the shift register shown in FIG. 7.

FIG. 8 is a schematic timing diagram of multiple shift registers based on the shift register shown in FIG. 7. In one or more embodiments, the output terminal of the (x−2)-th shift register is Gout (x−2), and the output terminal Gout (x−2) is also connected to the first trigger terminal INA of the (x−1)-th shift register. The output terminal of the (x−1)- th shift register is Gout (x−1), and the output terminal Gout (x−1) is also connected to the first trigger terminal INA of the x-th shift register. The output terminal of the x-th shift register is Gout (x), and the output terminal Gout (x) is also connected to the first trigger terminal INA of the (x+1)-th shift register. The output terminal of the (x+1)-th shift register is Gout (x+1), and the output terminal Gout (x+1) is also connected to the first trigger terminal INA of the (x+2)-th shift register. The output terminal of the (x+2)-th shift register is Gout (x+2).

The x-th shift register 10 is used as an example. Touch drive is inserted at the corresponding scanning position of the x-th shift register 10. Horizontal stripes, which affects the display effect, may be generated in the display panel for the following reasons.

Referring to FIG. 7 and FIG. 8, the process of performing touch insertion at the corresponding scanning position of the x-th shift register 10 is as follows.

In Ta1 stage, when the display panel scans to the x-th shift register 10, the twelfth transistor T12 is turned on. The high-level signal provided by DIR1 is written into the second node P2, so that the thirteenth transistor T13 is turned on. The first clock terminal CK1 provides a low-level signal, and the output terminal Gout (x) of the x-th shift register 10 outputs a low-level signal.

In Ta2 stage, the signal port Goff provides a high-level signal, so that display scanning drive of the display panel are interrupted, and a touch stage is inserted. In one or more embodiments, the first clock terminal CK1 and the second clock terminal CK2 provide low-level signals. The signal port Goff provides a high-level signal that enables the sixth transistor T6 to be turned on. The output terminal Gout(x) of the x-th shift register 10 keeps outputting a low-level signal. It is to be understood that when the touch scanning is inserted, the signal port Goff provides a high level signal to control the start of touch drive and to clear the output terminal Gout (x). During display scanning drive, the signal port Goff provides a low level signal. In this stage, the twelfth transistor T12 is turned off. The second node P2 should keep a high potential.

In Ta3 stage, after the touch drive ends, the second node P2 of the x-th shift register 10 should keep a high level, so that the thirteenth transistor T13 is kept on. The first clock terminal CK1 and the second clock terminal CK2 return to normal waveforms. In this manner, the high-level signal of the first clock terminal CK1 may be written to the output terminal Gout (x) through the turned-on thirteenth transistor T13. The touch drive of the x-th shift register 10 continues to be executed.

As described above, in a case where the x-th shift register 10 may continue to perform display scanning drive after the touch drive ends, the potential of the second node P2 of the x-th shift register 10 needs to keep a high potential from Ta1 stage to Ta3 stage to control the thirteenth transistor T13 to keep on.

However, it is found that when touch drive insertion is performed in Ta2 stage, the second capacitor C2 leaks electricity. As a result, the potential of the second node P2 may decrease. The thirteenth transistor T13 in the shift register 10 is used as an output transistor and has the largest width-to-length ratio. Thus, the Vgs of the thirteenth transistor T13 changes greatly, the VT curve drifts seriously, and the output current changes greatly. Consequently, the rising edge and the falling edge of the output waveform of the output terminal Gout (x) of the x-th shift register 10 are large.

Compared with the previous multiple shift registers, the rising edge and the falling edge of the output waveform of the output terminal Gout (x) of the x-th shift register 10 are large. As a result, the on time duration of at least one row of sub-pixels corresponding to the X-th shift register 10 is too short, which in turn results in too short charging time, low display brightness, thereby being prone to horizontal stripes.

For next multiple shift registers, the rising edge and the falling edge of the output waveform of the output terminal Gout (x) of the x-th shift register 10 are large. As a result, the on time duration of the twelfth transistor T12 of the next shift register is insufficient. Thus, the charging time of the second node P2 of the next shift register may be shortened, and the output waveform of the next shift register is affected. There may even be a problem where the potential of the second node P2 of the next shift register is difficult to enable the thirteenth transistor T13 to be turned on, resulting in a partial black screen.

According to the display panel provided in this embodiment, a voltage storage unit 120 is added to the first-type shift register 102. When the first-type shift register 102 performs touch insertion, the potential of the second node P2 used for enabling the first-type shift register 102 to continue to perform display scanning drive may be pre-stored in the voltage storage unit 120. During the touching process, the low-level signal provided by the first power supply terminal VG1 is written into the second node P2 and written into the output terminal Gout through the sixth transistor T6. The potential variation of the second node P2 does not affect the output waveform of the output terminal Gout. After the touch drive ends, the second node P2 is charged to a high level by the voltage storage unit 120, so that the second capacitor C2 is charged, and the thirteenth transistor T13 is turned on. The low-level signal provided by the first clock CK1 is written into the output terminal Gout. There is no leakage problem of the second capacitor C2. It is to be understood that the node PA in the voltage storage unit 120 stores the VGH charge of the second node P2. Although the node PA leaks electricity, the leakage amount is very small. In this manner, the impact of the leakage on the second node P2 is also very small. Moreover, there may be no problem that the VT curve of the thirteenth transistor T13 drifts seriously.

Thus, when the first-type shift register 102 provided in this embodiment performs touch insertion, the output waveform of the first-type shift register 102 tends to be consistent with the output waveforms of other stage shift registers, and no horizontal stripe is generated at the touch insertion position.

In one or more embodiments, the capacitance of the second capacitor C2 is higher than the capacitance of the third capacitor C3. In one or more embodiments, the capacitance of the second capacitor C2 is higher than the capacitance of the first capacitor C1.

In this embodiment, the first capacitor C1 mainly plays a bootstrap role and is configured to adjust the potential of the node PA according to the signal variation of the node PB. The second capacitor C2 mainly plays a bootstrap role and is configured to adjust the potential of the second node P2 according to the signal variation of the output terminal Gout. The third capacitor C3 mainly plays a coupling role and can block the first clock terminal CK1 and the fourth node P4. Of course, the first capacitor C1 and the second capacitor C2 also have a blocking function. The first capacitor C1 can block the node PA and the node PB. The second capacitor C2 can block the output terminal Gout and the second node P2.

The bootstrap requirement of the second capacitor C2 is higher than the bootstrap requirement of the first capacitor C1. Here, the capacitance of the second capacitor C2 is designed to be higher than the capacitance of the first capacitor C1, so that it can ensure that the bootstrap boost amplitude of the second capacitor C2 is greater. The bootstrap boost amplitude of the second capacitor C2 may be higher than the bootstrap boost amplitude of the first capacitor C1 to satisfy the higher bootstrap requirement of the second capacitor C2.

The bootstrap requirement of the second capacitor C2 is also higher than the bootstrap requirement of the third capacitor C3. Here, the capacitance of the second capacitor C2 is designed to be higher than the capacitance of the third capacitor C3, so that it can ensure that the bootstrap boost amplitude of the second capacitor C2 is greater. The bootstrap boost amplitude of the second capacitor C2 may be higher than the bootstrap boost amplitude of the third capacitor C3 to satisfy the higher bootstrap requirement of the second capacitor C2.

For a transistor, the greater the channel width-to-length ratio of the transistor is, the smaller the on resistance is, and the greater Id passing through the transistor is. Accordingly, the charging performance of the transistor may be improved. Based on the functions and connection methods of different transistors in a shift register, the width-to-length ratio of each transistor may be designed properly.

In one or more embodiments, the channel width-to-length ratio of the first transistor T1 is F1. The channel width-to-length ratio of the second transistor T2 is F2. F1 is greater than F2. In this embodiment, the channel width-to-length ratio F1 of the first transistor T1 may be designed to be slightly greater than the channel width-to-length ratio F2 of the second transistor T2.

In one or more embodiments, the channel width-to-length ratio of the second transistor T2 is F2, and the channel width-to-length ratio of the third transistor T3 is F3, where F2=F3. In one or more embodiments, the channel width-to-length ratio of the fifth transistor T5 is F5, and the channel width-to-length ratio of the sixth transistor T6 is F6, where F5=F6. In one or more embodiments, the channel width-to-length ratio of the second transistor T2 is F2, and the channel width-to-length ratio of the fifth transistor T5 is F5, where F2=F5. In this embodiment, the channel width-to-length ratio F2 of the second transistor T2, the channel width-to-length ratio F3 of the third transistor T3, the channel width-to-length ratio F5 of the fifth transistor T5, and the channel width-to-length ratio F6 of the sixth transistor T6 may be similar or the same. The channel width-to-length ratio F5 of the fifth transistor T5 may be equal to the channel width-to-length ratio F6 of the sixth transistor T6. The channel width-to-length ratios of the two may be designed to be the smallest in the shift register, which are much smaller than the channel width-to-length ratio F13 of the thirteenth transistor T13.

In one or more embodiments, the channel width-to-length ratio of the eighth transistor T8 is F8. The channel width-to-length ratio of the seventh transistor T7 is F7. F8 is greater than F7. The channel width-to-length ratio F8 of the eighth transistor T8 may be slightly greater than the channel width-to-length ratio F7 of the seventh transistor T7. The channel width-to-length ratio F8 of the eighth transistor T8 may be slightly smaller than the channel width-to-length ratio F9 of the ninth transistor T9.

In one or more embodiments, the channel width-to-length ratio of the third transistor T3 is F3. The channel width-to-length ratio of the thirteenth transistor T13 is F13. F3 is less than F13. In this embodiment, in the voltage storage unit 120, the channel width-to-length ratio F3 of the third transistor T3 is much smaller than the channel width-to-length ratio F13 of the thirteenth transistor T13. The function of the third transistor T3 in the voltage storage unit 120 is to write the signal of the fourth signal terminal VS4 to the node PB when the third transistor T3 is turned on. After the node PB is charged to a high level, the fourth transistor T4 is turned on. Thus, the charging performance requirement of the third transistor T3 is not high. The thirteenth transistor T13 is connected to the output terminal Gout. The first-type shift register 102 provides a drive signal to the display panel through the output terminal Gout. Thus, the charging performance requirement of the thirteenth transistor T13 is high. Moreover, the channel width-to-length ratio F3 of the third transistor T3 is designed to be much smaller than the channel width-to-length ratio F13 of the thirteenth transistor T13. The channel width-to-length ratio F3 of the third transistor T3 is designed to be the greatest in the shift register.

In one or more embodiments, the channel width-to-length ratio of the fourth transistor T4 is F4, and the channel width-to-length ratio of the twelfth transistor T12 is F12, F4=F12. In this embodiment, in the touch stage, the fourth transistor T4 has the same function as the twelfth transistor T12. After the fourth transistor T4 is turned off, the voltage storage unit 120 does not affect the voltage of the second node P2 and avoids the leakage to the second node P2. After the twelfth transistor T12 is turned off, the signal of the first signal terminal VS1 does not affect the voltage of the second node P2 and avoids the leakage to the second node P2. After the fourth transistor T4 is turned on, the signal of the node PB in the voltage storage unit 120 is written to the second node P2. After the twelfth transistor T12 is turned on, the signal provided by the first signal terminal VS1 is written into the second node P2. Based on this, the channel width-to-length ratio F4 of the fourth transistor T4 may be designed to be equal to the channel width-to-length ratio F12 of the twelfth transistor T12. It can be ensured that the charging effect of the second node P2 is consistent with the charging effect of other shift registers. Moreover, the shapes and orientations of the fourth transistor T4 and the twelfth transistor T12 may be the same.

In this embodiment, the channel width-to-length ratio F10 of the tenth transistor T10 is close to the channel width-to-length ratio F12 of the twelfth transistor T12. The control terminal of the tenth transistor T10 is connected to the second trigger terminal. The control terminal of the twelfth transistor T12 is connected to the first trigger terminal. Thus, the tenth transistor T10 and the twelfth transistor T12 play similar roles in the shift register. Through different trigger methods, the forward scanning and backward scanning of the shift register are implemented.

The ninth transistor T9 and the eleventh transistor T11 play similar roles in the shift register. In a case where there is a need to simplify the circuit, the eleventh transistor T11 may be deleted. The eleventh transistor T11 is added, so that the output stability of the output terminal Gout may be improved. Thus, the channel width-to-length ratio F9 of the ninth transistor T9 and the channel width-to-length ratio F11 of the eleventh transistor T11 may be similar or the same.

Figure 9:
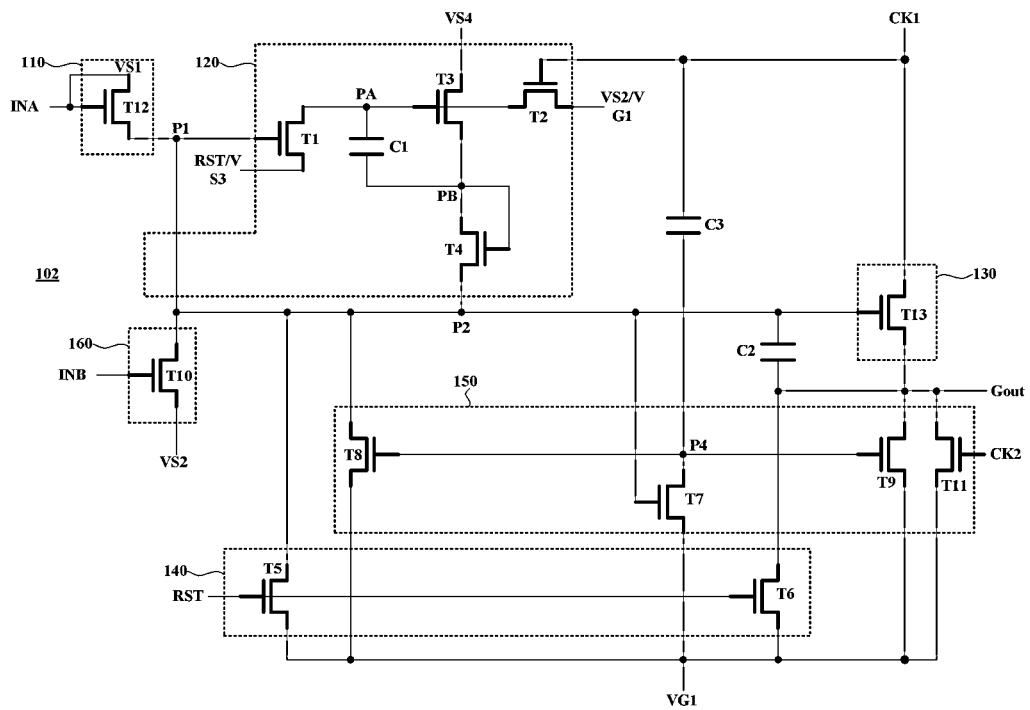
FIG. 9 is a schematic diagram of another first-type shift register according to an embodiment of the present application.

In one or more embodiments, the first trigger terminal is also served as the first signal terminal. FIG. 9 is a schematic diagram of another first-type shift register according to an embodiment of the present application. As shown in FIG. 9, in one or more embodiments, the first signal terminal VS1 is connected to the first trigger terminal INA. In this embodiment, the wire connected to the first trigger terminal INA provides a signal that alternates between high and low levels to the first trigger terminal INA.

Referring to FIGS. 4 and 6, in the first stage Ti21, the signals of the first trigger terminal INA and the first signal terminal VS1 are high-level signals. In the stage after the first stage Ti21, the signal of the first trigger terminal INA is a low-level signal, so that the twelfth transistor T12 is turned off. The transmission path between the first signal terminal VS1 and the first node P1 is disconnected. The high and low level transition of the signal of the first signal terminal VS1 no longer affects the potential of the first node P1. Based on this, the wire connected to the first trigger terminal INA may simultaneously transmit a signal to the first signal terminal VS1.

For the first-type shift register 102 in FIG. 9, in the first stage Ti21, the wire connected to the first trigger terminal INA provides a high-level signal. The high-level signal is also written to the first signal terminal VS1 and written to the first node P1 through the turned-on twelfth transistor T12. In the stage after the first stage Ti21, the wire connected to the first trigger terminal INA provides a low-level signal, so that the twelfth transistor T12 is turned off. The transmission path between the first signal terminal VS1 and the first node P1 is disconnected. The high and low level transition of the signal of the wire connected to the first trigger terminal INA no longer affects the potential of the first node P1.

Based on this, the first signal terminal VS1 and the first trigger terminal INA are connected to the same wire. At least one wire may be reduced in the display panel, which facilitates the implementation of a narrow bezel and a full screen.

In one or more embodiments, the third signal terminal is also served as the reset control terminal. As shown in FIG. 9, in one or more embodiments, the third signal terminal VS3 is connected to the reset control terminal RST. In this embodiment, the electrical signal provided by the wire connected to the reset control terminal RST to the reset control terminal RST may undergo a high and low level transition.

Referring to FIGS. 4 and 6, in the first stage Ti21, the third signal terminal VS3 provides a low-level signal VGH. The low-level signal is written into the node PA, so that the third transistor T3 is turned off. The fourth transistor T4 maintains in an OFF state, that is, the low-level signal of the third signal terminal VS3 does not affect the ON state or OFF state of the fourth transistor T4.

In the first sub-stage Ti221 of the second stage Ti22, in a case where the reset control terminal RST and the third signal terminal VS3 provide high-level signals at the same time, the low-level signal provided by the first power supply terminal VG1 gradually pulls down the potential of the second node P2. In this case, the potential of the second node P2 can also control the first transistor T1 to maintain in the ON state, and the high-level signal provided by the third signal terminal VG3 is written into the node PA. Sequentially, the potential of the second node P2 continuously decreases until the potential is pulled down to a low level. Then, the first transistor T1 is turned off. Apparently, in the first sub-stage Ti221 of the second stage Ti22, the reset control terminal RST and the third signal terminal VS3 provide high-level signals at the same time. During the time period before the second node P2 is pulled down to the low level, the third signal terminal VS3 may charge the node PA. Based on this, the wire connected to the reset control terminal RST may simultaneously transmit a signal to the third signal terminal VS3.

For the first-type shift register 102 in FIG. 9, in the first stage Ti21, the wire connected to the reset control terminal RST provides a low-level signal to the third signal terminal VS3. The low-level signal is written into the node PA, so that the third transistor T3 is turned off. The fourth transistor T4 maintains in an OFF state. In the second stage Ti22, the wire connected to the reset control terminal RST provides a high-level signal to the third signal terminal VS3.

Based on this, the third signal terminal VS3 and the reset control terminal RST are connected to the same wire. At least one wire may be reduced in the display panel, which facilitates the implementation of a narrow bezel and a full screen.

In one or more embodiments, the first power supply terminal is also served as the second signal terminal. As shown in FIG. 9, in one or more embodiments, the first power supply terminal VG1 is connected to the second signal terminal VS2. In this embodiment, the wire connected to the first power supply terminal VG1 provides a low-level signal to the first power supply terminal VG1. The wire connected to the second signal terminal VS2 provides a low-level signal to the second signal terminal VS2. Based on this, the second signal terminal VS2 and the first power supply terminal VG1 are connected to the same wire. At least one wire may be reduced in the display panel, which facilitates the implementation of a narrow bezel and a full screen.

Figure 10:
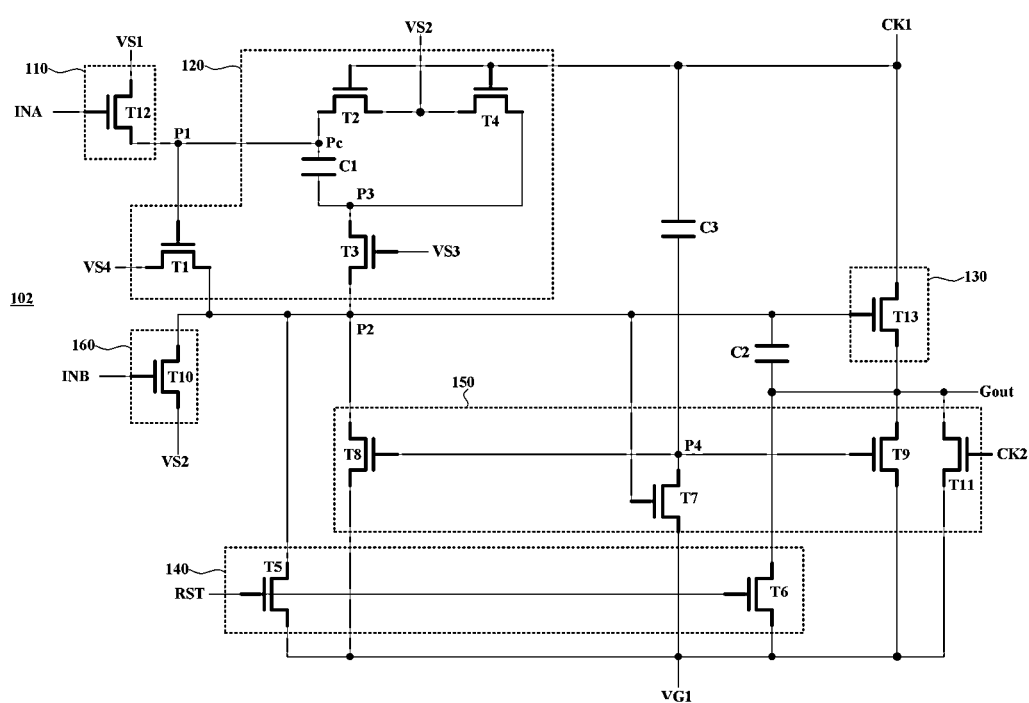
FIG. 10 is a schematic diagram of another first-type shift register according to an embodiment of the present application.

FIG. 10 is a schematic diagram of another first-type shift register according to an embodiment of the present application. The first-type shift register shown in FIG. 10 is different from the first-type shift register shown in FIG. 4. The difference in FIG. 10 is that in one or more embodiments, the voltage storage unit 120 includes a first transistor T1, a second transistor T2, a third transistor T3, a fourth transistor T4, and a first capacitor C1. The gate of the first transistor T1 is connected to the first node P1. The first transistor T1 is connected between the fourth signal terminal VS4 and the second node P2. The gate of the second transistor T2 is connected to the first clock terminal CK1. The second transistor T2 is connected between the second signal terminal VS2 and the first node P1. The gate of the third transistor T3 is connected to the third signal terminal VS3. The third transistor T3 is connected between the second node P2 and a third node P3. The gate of the fourth transistor T4 is connected to the first clock terminal CK1. The fourth transistor T4 is connected between the second signal terminal VS2 and the third node P3. The first capacitor C1 is coupled between the third node P3 and the first node P1. The first node P1 is not directly electrically connected to the second node P2.

In this embodiment, each of the first transistor T1, the second transistor T2, the third transistor T3, and the fourth transistor T4 is an N-type. In any one of the first transistor T1, the second transistor T2, the third transistor T3, and the fourth transistor T4, when the signal received by the gate is a high level, the corresponding transistor is controlled to be turned on; and when the signal received by the gate is a low level, the corresponding transistor is controlled to be turned off. In one or more other embodiments, the first transistor, the second transistor, the third transistor, and the fourth transistor are all P-types. In one or more embodiments, at least one of the first transistor, the second transistor, the third transistor, or the fourth transistor is a P-type, or at least one of the first transistor, the second transistor, the third transistor, or the fourth transistor is an N-type.

As shown in FIG. 10, in one or more embodiments, the node control unit 150 also includes an eleventh transistor T11. The gate of the eleventh transistor T11 is connected to the second clock terminal CK2. The eleventh transistor T11 is connected between the first power supply terminal VG1 and the output terminal Gout.

The display panel performs display scanning drive. In a case where the intra-frame touch drive needs to be performed, when the display panel scans to the first-type shift register, the display scanning drive of the first-type shift register 102 is suspended, and the touch drive is enabled. In the touch stage, the first clock terminal CK1 and the second clock terminal CK2 do not provide normal waveforms. In one or more embodiments, the first clock terminal CK1 and the second clock terminal CK2 provide low-level signals.

Figure 11:
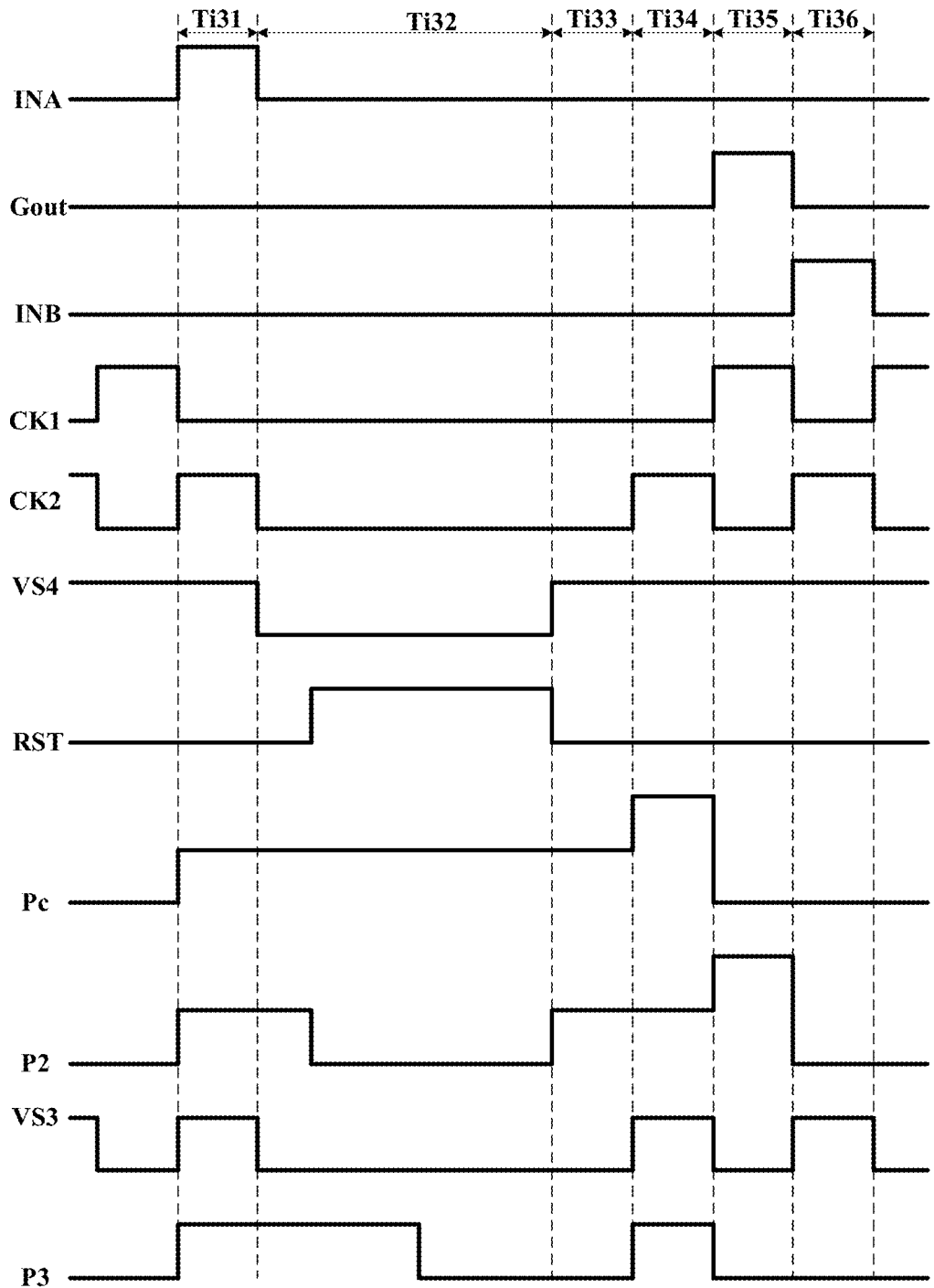
FIG. 11 is a schematic timing diagram for performing intra-frame touching by a first-type shift register shown in FIG. 10.

FIG. 11 is a schematic timing diagram for performing intra-frame touching by a first-type shift register shown in FIG. 10. Referring to FIGS. 10 and 11, the operation process of the first-type shift register includes at least the stages below.

In the first stage Ti31, the first trigger terminal INA of the first-type shift register 102 receives a high-level signal, so that the twelfth transistor T12 is turned on. The high-level signal provided by the first signal terminal VS1 is written into the first node P1, so that the first transistor T1 is turned on, and the node Pc is charged. The high-level signal provided by the fourth signal terminal VS4 is written into the second node P2, so that the thirteenth transistor T13 is turned on. The low-level signal provided by the first clock CK1 is written into the output terminal Gout. The high-level signal provided by the third signal terminal VS3 enables the third transistor T3 to be turned on and charges the third node P3. It is to be understood that when the second node P2 is in a high-level signal, the first-type shift register 102 may be started. Thus, in this stage, the high-level signal written to the node Pc may be understood as a potential that stores the second node P2 and may be used for enabling the first-type shift register 102 to perform display scanning drive. In one or more embodiments, the high-level signal written to the node Pc is stored in the first capacitor C1.

In the second stage Ti32, the first-type shift register 102 enters a touch stage. In one or more embodiments, the high-level signal written to the node Pc is stored in the first capacitor C1. In the second stage Ti32, the first-type shift register 102 enters a touch stage. In one or more embodiments, the first trigger terminal INA of the first-type shift register 102 receives a low-level signal, so that the twelfth transistor T12 is turned off. The low-level signal provided by the third signal terminal VS3 enables the third transistor T3 to be turned off. The third node P3 and the node Pc keep high potentials. The charge stored in the first capacitor C1 enables the third node P3 and the node Pc to maintain high levels (VGHs) and enables the first transistor T1 to keep on. The low-level signal provided by the fourth signal terminal VS4 pulls down the potential of the second node P2. The signal of the reset control terminal RST transits from a low-level signal to a high-level signal, so that the fifth transistor T5 and the sixth transistor T6 are switched from off to on. The low-level signal provided by the first power supply terminal VG1 is written into the second node P2 and the output terminal Gout, and the potential of the second node P2 is gradually pulled down from a high level to a low level. The thirteenth transistor T13 is turned off. In the second stage Ti32, the thirteenth transistor T13 is turned off, that is, Vgs=0. In this case, the bias voltage time of the first-type shift register 102 is consistent with the bias voltage time of other shift registers, which may avoid display horizontal stripes caused by inconsistent threshold voltages Vth caused by inconsistent bias voltage time of different shift registers, thereby improving the display effect. It is to be understood that in this case, the high level of the node Pc, that is, a VGH charge, is a VGH charge used for starting the first-type shift register 102. It is to be noted that during this stage, The third node P3 leaks electricity.

In the third stage Ti33, the touch stage of the first-type shift register 102 ends. In one or more embodiments, the node Pc maintains a high level (VGH) based on the coupling effect of the first capacitor C1, so that the first transistor T1 is kept on. The high-level signal provided by the fourth signal terminal VS4 is written into the second node P2. The low-level signal of the second node P2 enables the thirteenth transistor T13 to be turned on. The low-level signal provided by the first clock CK1 is written into the output terminal Gout. After the touch stage ends, the high level, that is, the VGH charge, is written into the second node P2. It is to be understood that the VGH charge stored in the voltage storage unit 120 for starting the first-type shift register 102 is written into the second node P2.

In the fourth stage Ti34, the high-level signal provided by the third signal terminal VS3 enables the third transistor T3 to be turned on. Then the high-level signal provided by the fourth signal terminal VS4 charges the third node P3 through the first transistor T1 and the third transistor T3. The second node P2 maintains a high level. The thirteenth transistor T13 is turned on. The low-level signal provided by the first clock CK1 is written into the output terminal Gout. The third node P3 is gradually charged to a high potential. The high-level signal of the third node P3 is coupled through the first capacitor C1, so that the potential of the node Pc is raised, and it is ensured that the first transistor T1 is in an ON state.

In the fifth stage Ti35, the first clock terminal CK1 and the second clock terminal CK2 provide normal waveforms. In one or more embodiments, the high level of the second node P2 enables the thirteenth transistor T13 to be turned on. The high-level signal provided by the first clock CK1 is written into the output terminal Gout. The high level of the output terminal Gout is coupled through the second capacitor C2, so that the potential of the second node P2 is raised. The high-level signal provided by the first clock terminal CK1 enables the second transistor T2 and the fourth transistor T4 to be turned on. The low-level signal provided by the second signal terminal VS2 is written into the node Pc and the third node P3. The low-level signal provided by the third signal terminal VS3 controls the third transistor T3 to be turned off. The potentials of the node Pc and the third node P3 do not affect the potential of the second node P2. The first-type shift register 102 starts to perform display scanning drive. Thus, after the touch drive is completed, the first-type shift register 102 performs normal display scanning drive.

In the sixth stage Ti36, the second trigger terminal INB of the first-type shift register 102 receives a high-level signal, so that the tenth transistor T10 is turned on. The low-level signal provided by the second signal terminal VS2 is written into the second node P2, so that the thirteenth transistor T13 is turned off. The high-level signal provided by the second clock terminal CK2 enables the eleventh transistor T11 to be turned on. The low-level signal provided by the first power supply terminal VG1 is written into the output terminal Gout.

As described above, the first trigger terminal INA of the first-type shift register 102 receives a high-level signal, which indicates that the display panel scans to the first-type shift register 102. In this stage Ti31, the voltage storage unit 120 of the first-type shift register 102 is configured to store the VGH charge that starts the shift register. In one or more embodiments, the VGH charge that starts the shift register is stored in the node Pc and the third node P3 of the voltage storage unit 120.

From the second stage Ti32 to the fourth stage Ti34, the output terminal Gout of the first-type shift register 102 outputs a low-level signal, and the display scanning drive are interrupted. During this stage, touch timing can be inserted into the display panel to implement intra-frame touch. After the touch stage ends, the voltage storage unit 120 writes the high-level signal provided by the fourth signal terminal VS4 into the second node P2. It is to be understood that the VGH charge used for starting the shift register is written into the second node P2.

In the fifth stage Ti35, the first clock terminal CK1 and the second clock terminal CK2 provide normal clock signals. The first-type shift register 102 continues to perform display scanning drive. The output terminal Gout outputs a high-level signal for performing display scanning drive on the sub-pixels of the corresponding row. The display panel continues to perform display scanning drive. After the fifth stage Ti35, the output terminal Gout outputs a low-level signal until the first trigger terminal INA receives a high-level signal again.

According to the display panel provided in this embodiment, a voltage storage unit 120 is added to the first-type shift register 102. When the first-type shift register 102 performs touch insertion, the potential of the second node P2 used for enabling the first-type shift register 102 to continue to perform display scanning drive may be pre-stored in the voltage storage unit 120. During the touching process, the low-level signal provided by the first power supply terminal VG1 is written into the second node P2 and written into the output terminal Gout through the sixth transistor T6. The potential variation of the second node P2 does not affect the output waveform of the output terminal Gout. After the touch stage ends, the second node P2 is charged to a high level by the voltage storage unit 120, so that the second capacitor C2 is charged, and the thirteenth transistor T13 is turned on. The low-level signal provided by the first clock CK1 is written into the output terminal Gout. There is no leakage problem of the second capacitor C2. It is to be understood that the third node P3 in the voltage storage unit 120 stores the VGH charge of the second node P2. Although the third node P3 leaks electricity, the leakage amount is very small. In this manner, the impact of the leakage on the second node P2 is also very small. Moreover, there may be no problem that the VT curve of the thirteenth transistor T13 drifts seriously.

Thus, when the first-type shift register 102 provided in this embodiment performs touch insertion, the output waveform of the first-type shift register 102 tends to be consistent with the output waveforms of other shift registers, and no horizontal stripe is generated at the touch insertion position.

Figure 12:
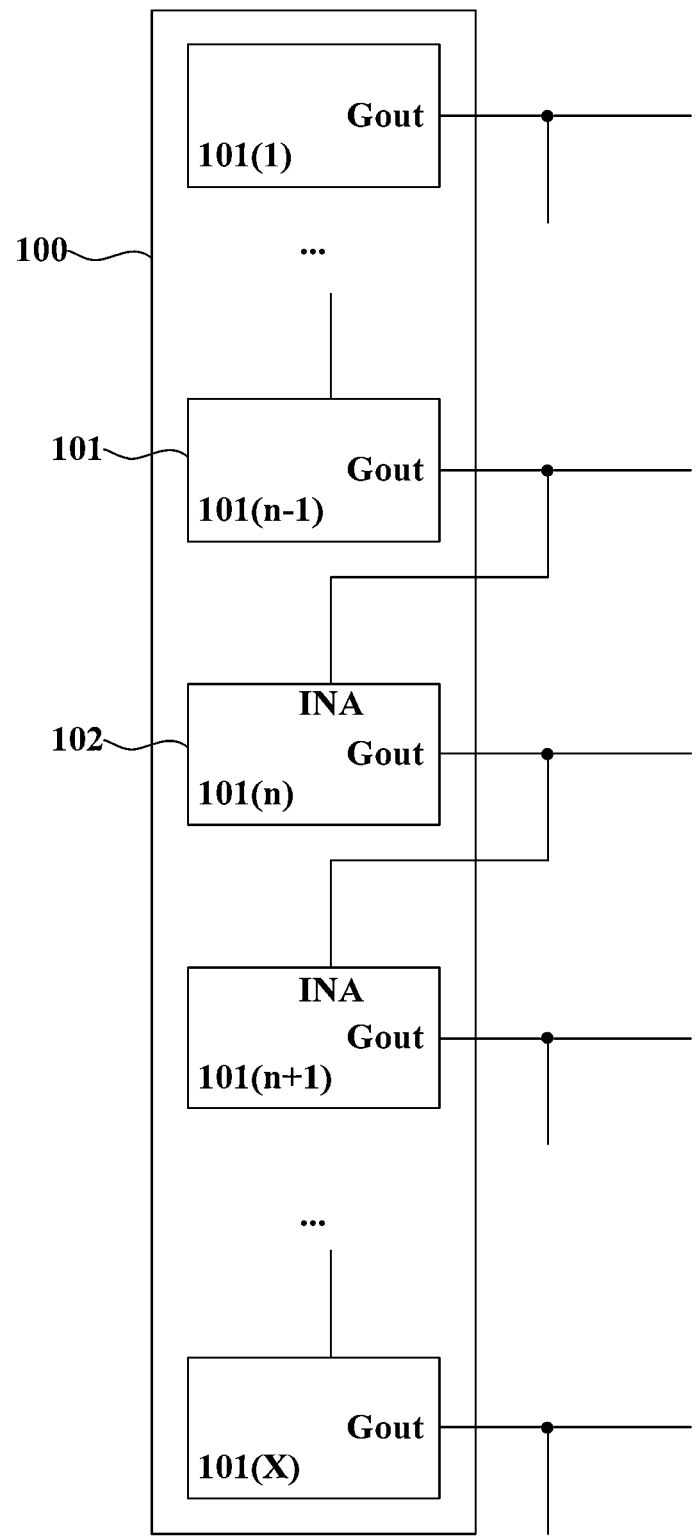
FIG. 12 is a schematic diagram of a first drive circuit according to an embodiment of the present application.

FIG. 12 is a schematic diagram of a first drive circuit according to an embodiment of the present application. As shown in FIG. 12, in one or more embodiments, a first trigger terminal INA of a first-type shift register 102 being the n-th shift register 101(n) is connected to the output terminal of a previous shift register 101. In one or more embodiments, the first-type shift register 102 is the n-th shift register 101.

The first drive circuit 100 includes multiple shift registers 101. In one or more embodiments, the first drive circuit 100 includes X cascaded shift registers 101. The value of X is a positive integer greater than 2. According to the cascading sequence, the shift registers 101 of the X cascaded shift registers 101 are labeled sequentially as the first shift register 101(1), the second shift register 101(2), . . . , the (n−1)-th shift register 101(n−1), the n-th shift register 101(n), the (n+1)-th shift register 101(n+1), . . . , and the X-th shift register 101(X). The value of n is a positive integer greater than 1. The multiple shift registers 101 are shifted and driven in the cascading sequence. Based on this, the output terminal Gout of the shift register 101 being the n-th shift register 101(n) is connected to the corresponding sub-pixel (not shown) to output a drive signal and is also connected to the trigger terminal of a next shift register 101 to drive the next shift register 101 to work.

In one or more other embodiments, the first trigger terminal of the n-th shift register is connected to the output terminal of the (n−m)-th shift register, where m may be equal to 1. In one or more embodiments, m may be greater than 1. Thus, the cascading between the n-th shift register and the (n−m)-th shift register is not limited to adjacent shift register units. The cascading between the n-th shift register and the (n−m)-th shift register may be arranged every m shift registers, where m may be equal to 2, 4, 6, or others. The cascading arrangements is set according to practical requirements.

In one or more embodiments, the n-th shift register 101(n) in X cascaded shift registers 101 is the first-type shift register 102. For the first-type shift register 102 being the n-th shift register 101(n), the first trigger terminal INA of the first-type shift register 102 is connected to a previous shift register 101, that is, the output terminal Gout of the (n−1)-th shift register 101(n−1). The output terminal Gout of the first-type shift register 102 being the n-th shift register 101(n), is connected to a next shift register 101, that is, the trigger terminal In of the (n+1)-th shift register 101(n+1).

When the display panel displays, the first drive circuit 100 is in a scan drive mode. In this case, X cascaded shift registers 101 perform normal shifting and driving. The output terminal Gout of the first-type shift register 102 outputs a normal drive signal.

Figure 13:
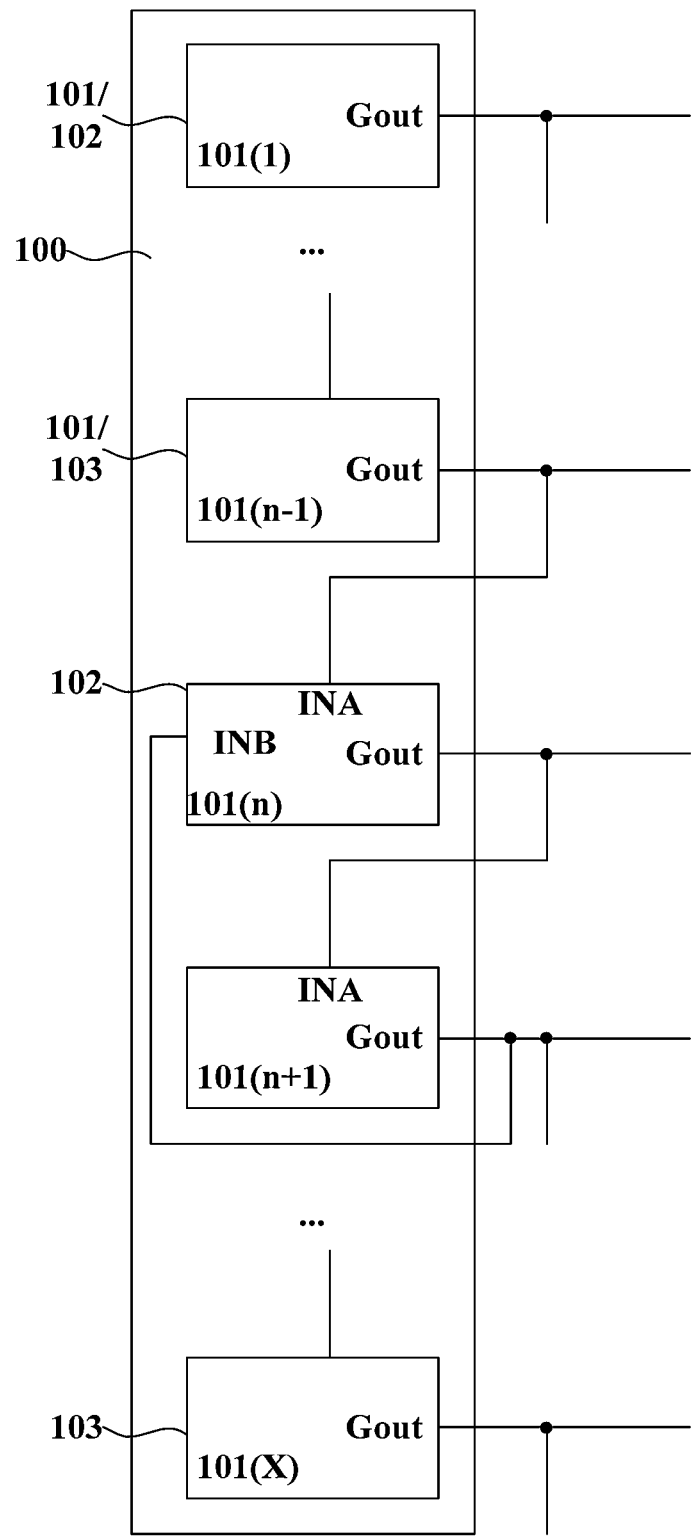
FIG. 13 is a schematic diagram of another first drive circuit according to an embodiment of the present application.

FIG. 13 is a schematic diagram of another first drive circuit according to an embodiment of the present application. As shown in FIG. 13, in one or more embodiments, the second trigger terminal INB of the first-type shift register 102 being the n-th shift register 101(n) is connected to the output terminal Gout of a next shift register 101.

In one or more embodiments, the first drive circuit 100 includes X cascaded shift registers 101. The value of X is a positive integer greater than 2. According to the cascading sequence, the X cascaded shift registers 101 are labeled sequentially as the first shift register 101(1), the second shift register 101(2), . . . , the (n−1)-th shift register 101(n−1), the n-th shift register 101(n), the (n+1)-th shift register 101(n+1), . . . , and the X-th shift register 101(X). The value of n is a positive integer greater than 1. The multiple shift registers 101 may be shifted and driven in sequence from the first shift register to the X-th shift register.

In one or more other embodiments, the cascading relationship of the multiple shift registers is adjusted, so that forward and back-forward scanning of the first drive circuit may be implemented. FIG. 12 shows only the structure of the first drive circuit that performs shifting and driving in sequence from the first shift register to the X-th shift register.

In one or more other embodiments, the second trigger terminal of the n-th shift register is connected to the output terminal of the (n+m)-th shift register, where m may be equal to 1. In one or more embodiments, m may be greater than 1. Thus, the cascading is not limited to adjacent shift register units. The cascading may be performed every m shift registers, where m may be equal to 2, 4, 6, or other numbers. The cascading is set according to practical requirements. In addition, it is to be noted that although the cascaded terminal and the output terminal in FIG. 12 are the same terminal, however, in one or more other embodiments of the present application, the cascaded terminal and the output terminal may be independent ports.

In one or more embodiments, the n-th shift register $101(n)$ in X cascaded shift registers 101 is the first-type shift register 102. For the first-type shift register 102 being the n-th shift register $101(n)$, the first trigger terminal INA of the first-type shift register 102 is connected to a previous shift register 101, that is, the output terminal Gout of the (n−1)-th shift register $101(n-1)$. The output terminal Gout of the first-type shift register 102 being the n-th shift register $101(n)$ is connected to a next shift register 101, that is, the trigger terminal In of the (n+1)-th shift register $101(n+1)$, so that the sequential shifting and driving from the first one to the X-th one of the X cascaded shift registers 101 are implemented.

When the display panel displays, the first drive circuit 100 is in a scan drive mode. In this case, X cascaded shift registers 101 perform normal shifting and driving. The output terminal Gout of the first-type shift register 102 outputs a normal drive signal. The display panel may choose to perform shifting and driving in sequence from the first shift register to the X-th shift register according to display requirements. In one or more embodiments, the display panel may choose to perform shifting and driving in sequence from the X-th one to the first one of the X shift registers according to display requirements.

Figure 14:
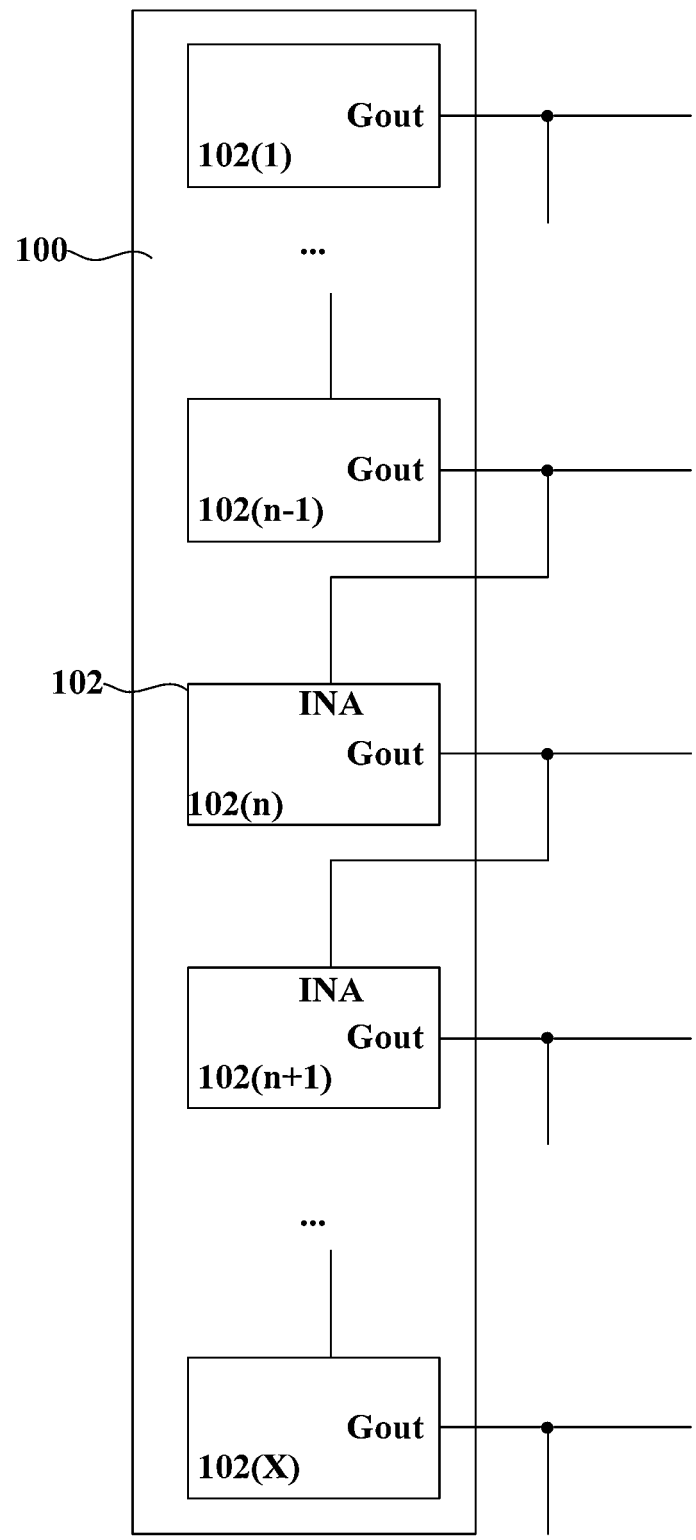
FIG. 14 is a schematic diagram of another first drive circuit according to an embodiment of the present application.

FIG. 14 is a schematic diagram of another first drive circuit according to an embodiment of the present application. As shown in FIG. 14, in one or more embodiments, the shift registers in the first drive circuit 100 are all first-type shift registers, that is, each shift register includes a voltage storage unit. Any shift register in the first drive circuit 100 is the first-type shift register 102, so that a touch stage may be inserted at any display scanning position of the display panel. In a case where only part of the shift registers in the first drive circuit are first-type shift registers, a touch stage may be inserted at a scanning position corresponding to the first-type shift register.

For the case where the shift registers in the first drive circuit 100 are all first-type shift registers, for example, the touch timing is to be inserted at the position of the 100-th shift register, when scanning to the 100-th shift register, a high-level signal is provided for the wire connected to the reset control terminal RST, and a low-level signal is provided for a clock line connected to the first clock terminal CK1 and a clock line connected to the second clock terminal CK2, so that the display scanning drive of the 100-th shift register may be interrupted. In this case, the output terminal Gout of the 100-th shift register outputs a low-level signal. After the touching is completed, a normal clock waveform is provided for the clock line connected to the first clock terminal CK1 and the clock line connected to the second clock terminal CK2, and display scanning drive are continued.

For other shift registers, when the signal of the reset control terminal RST transits to a high-level signal, the low-level signal provided by the first power supply terminal VG1 may be written to the output terminal Gout through the turned-on sixth transistor T6. When the signal of the first clock terminal CK1 and the signal of the second clock terminal CK2 transit, since the second node P2 keeps a low potential, the output terminal Gout keeps outputting a low level. The transition of the signal of the first clock terminal CK1 and the transition of the signal of the second clock terminal CK2 do not affect the output terminal Gout.

Thus, the touch stage is inserted at the corresponding position of the 100-th shift register, which does not affect the output terminals Gout of other shift registers. The output terminals Gout of the other shift registers keep outputting a low level.

Similarly, for the case where part of the shift registers in the first drive circuit are first-type shift registers, touch insertion may be performed when the display panel scans to the first-type shift register, which does not affect the output terminals Gout of other shift registers. The output terminals Gout of the other shift registers keep outputting a low level.

In one or more embodiments, at least one shift register of the first drive circuit is a second-type shift register. The second-type shift register does not include a voltage storage unit. As shown in FIG. 13, in one or more embodiments, part of the shift registers 101 in the first drive circuit 100 are first-type shift registers 102. Accordingly, at least one remaining shift register 101 is the second-type shift register 103. The difference between the first-type shift register 102 and the second-type shift register 103 lie in that the first-type shift register 102 includes a voltage storage unit 120, and the second-type shift register 103 does not include a voltage storage unit. Thus, the second-type shift register 103 cannot be configured to store a charge that starts a shift register. In this manner, the corresponding driving position of the second-type shift register 103 cannot be used for inserting a touch stage. The corresponding driving position of the first-type shift register 102 may be used for inserting a touch stage.

It can be seen from the above that as shown in FIG. 13, the corresponding position of the first drive circuit that may be used for touch insertion is fixed, and in one or more embodiments, is the scanning position of the first-type shift register. For example, in case where the 100-th one, the 200-th one, the 300-th one, the 400-th one, and the 500-th one of the shift registers in the first drive circuit are first-type shift registers, the touch timing may be inserted into at least one scanning position of the 100-th one, the 200-th one, the 300-th one, the 400-th one, and the 500-th one of the shift registers.

For the case where part of the shift registers are first-type shift registers to each of which a voltage storage unit may be added by squeezing, to prevent an increase in the bezel.

It is to be noted that the shift register applicable to the voltage storage unit may have the structure in FIG. 3, FIG. 4, FIG. 7, FIG. 9, or FIG. 10, but is not limited thereto. In a case where a shift register has a similar first node P1 and second node P2, the voltage storage unit is also applicable therein.

Figure 15:
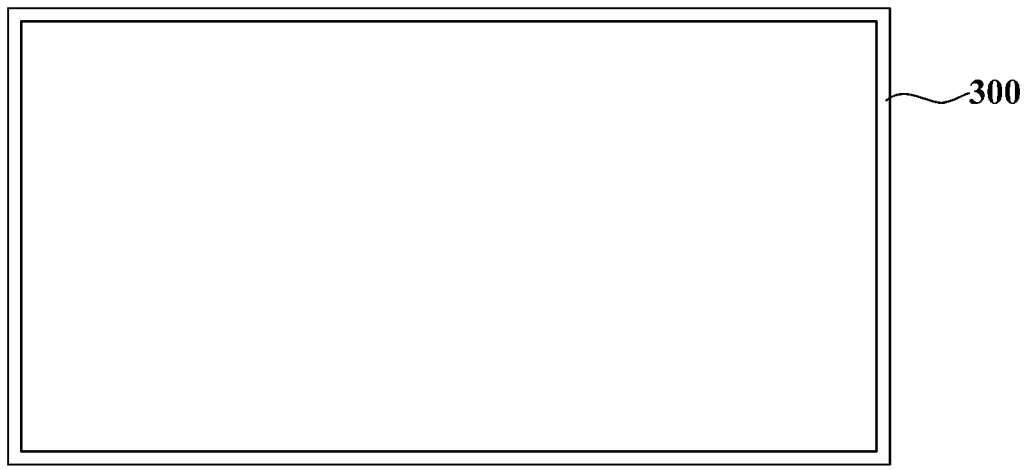
FIG. 15 is a schematic diagram of a display device according to an embodiment of the present application.

An embodiment of the present application provides a display device. The display device includes the display panel according to any one of the embodiments described above. The display device may be applied to a liquid crystal display device or may be applied to an organic light-emitting display device, which is not limited thereto. The display device may also be an in-vehicle display product, and the display device has display and touch functions and has a cost advantage. FIG. 15 is a schematic diagram of a display device according to an embodiment of the present application. As shown in FIG. 15, in one or more embodiments, the display device is an in-vehicle display screen 300.

The display panel has a touch function and a display function. The touch stage may be embedded in the display stage. That is, when touching is performed in the display stage, touch stage may be inserted into the corresponding position of the first-type shift register to implement touching. The voltage storage unit of the first-type shift register may store a charge used for starting a shift register, so that normal output and stage transmission functions are ensured, and bias voltage transfer is implemented.

An embodiment of the present application provides a display panel. For the display panel provided by this embodiment of the present application, reference may be made to FIG. 3 and FIG. 4. The display panel includes a first drive circuit 100. The first drive circuit 100 includes multiple shift registers 101. At least one shift register 101 is a first-type shift register 102. The first-type shift register 102 includes a pull-up unit 110, a voltage storage unit 120, and a first output unit 130. The pull-up unit 110 is connected to the first trigger terminal INA, the first signal terminal VS1, and the first node P1. The voltage storage unit 120 includes a first transistor T1, a second transistor T2, a third transistor T3, a fourth transistor T4, and a first capacitor C1. The gate of the first transistor T1 is connected to the first node P1. The first transistor T1 is connected between the third signal terminal VS3 and the gate of the third transistor T3. The gate of the second transistor T2 is connected to the first clock terminal CK1. The second transistor T2 is connected between the second signal terminal VS2 and the gate of the third transistor T3. The third transistor T3 is connected between the fourth signal terminal VS4 and the gate of the fourth transistor T4. The fourth transistor T4 is connected between the gate of the fourth transistor T4 and the second node P2. The first capacitor C1 is coupled between the gate of the third transistor T3 and the gate of the fourth transistor T4. The first output unit 130 is connected to the second node P2, the first clock terminal CK1, and the output terminal Gout.

In one or more embodiments, the first-type shift register 102 also includes a node control unit 150 and a third capacitor C3. The node control unit 150 includes a seventh transistor T7, an eighth transistor T8, and a ninth transistor T9. The gate of the seventh transistor T7 is connected to the second node P2. The seventh transistor T7 is connected to the first power supply terminal VG1 and a fourth node P4. The gate of the eighth transistor T8 is connected to the fourth node P4. The eighth transistor T8 is connected between the first power supply terminal VG1 and the second node P2. The gate of the ninth transistor T9 is connected to the fourth node P4. The ninth transistor T9 is connected between the first power supply terminal VG1 and the output terminal Gout. The third capacitor C3 is coupled between the first clock terminal CK1 and the fourth node P4.

In one or more embodiments, the first-type shift register 102 also includes an eleventh transistor T11. The gate of the eleventh transistor T11 is connected to the second clock terminal CK2. The eleventh transistor T11 is connected between the first power supply terminal VG1 and the output terminal Gout.

For the display panel provided by this embodiment of the present application, reference may be made to FIG. 3 and FIG. 4. The display panel has corresponding functions and beneficial effects, and details are not described again.

Based on the same concept, an embodiment of the present application provides a display panel. For the display panel provided by this embodiment of the present application, reference may be made to FIG. 10. The display panel includes a first drive circuit 100. The first drive circuit 100 includes multiple shift registers 101. At least one shift register 101 is a first-type shift register 102. The first-type shift register 102 includes a pull-up unit 110, a voltage storage unit 120, and a first output unit 130. The pull-up unit 110 is connected to the first trigger terminal INA, the first signal terminal VS1, and the first node P1. The voltage storage unit 120 includes a first transistor T1, a second transistor T2, a third transistor T3, a fourth transistor T4, and a first capacitor C1. The gate of the first transistor T1 is connected to the first node P1. The first transistor T1 is connected between the fourth signal terminal VS4 and the second node P2. The gate of the second transistor T2 is connected to the first clock terminal CK1. The second transistor T2 is connected between the second signal terminal VS2 and the first node P1. The gate of the third transistor T3 is connected to the third signal terminal VS3. The third transistor T3 is connected between the second node P2 and the third node P3. The gate of the fourth transistor T4 is connected to the first clock terminal CK1. The fourth transistor T4 is connected between the second signal terminal VS2 and the third node P3. The first capacitor C1 is coupled between the third node P3 and the first node P1. The first output unit 130 is connected to the second node P2, the first clock terminal CK1, and the output terminal Gout.

In one or more embodiments, the first-type shift register 102 also includes a node control unit 150 and a third capacitor C3. The node control unit 150 includes a seventh transistor T7, an eighth transistor T8, and a ninth transistor T9. The gate of the seventh transistor T7 is connected to the second node P2. The seventh transistor T7 is connected to the first power supply terminal VG1 and the fourth node P4. The gate of the eighth transistor T8 is connected to the fourth node P4. The eighth transistor T8 is connected between the first power supply terminal VG1 and the second node P2. The gate of the ninth transistor T9 is connected to the fourth node P4. The ninth transistor T9 is connected between the first power supply terminal VG1 and the output terminal Gout. The third capacitor C3 is coupled between the first clock terminal CK1 and the fourth node P4.

In one or more embodiments, the first-type shift register 102 also includes an eleventh transistor T11. The gate of the eleventh transistor T11 is connected to the second clock terminal CK2. The eleventh transistor T11 is connected between the first power supply terminal VG1 and the output terminal Gout.

For the display panel provided by this embodiment of the present application, reference may be made to FIG. 10. The display panel has corresponding functions and beneficial effects, and details are not described again.

What is claimed is:
1. A display panel, comprising:
a first drive circuit comprising a plurality of shift registers, wherein at least one shift register of the plurality of shift registers is a first-type shift register; and
the first-type shift register comprises a pull-up unit, a voltage storage unit, and a first output unit, wherein
the pull-up unit is connected to a first trigger terminal, a first signal terminal, and a first node, and the pull-up unit is configured to, in response to control of the first trigger terminal, adjust a signal of the first node according to a signal of the first signal terminal;
the voltage storage unit is connected to the first node, a first clock terminal, a second signal terminal, a third signal terminal, a fourth signal terminal, and a second node, and the pull-up unit is configured to, in response to control of the first node and control of the first clock terminal, adjust a signal of the second node or store the signal of the second node according to a signal of the second signal terminal, a signal of the third signal terminal, and a signal of the fourth signal terminal; and the first output unit is connected to the second node, the first clock terminal, and an output terminal and configured to, in response to control of the second node, adjust a signal of the output terminal according to a signal of the first clock terminal;

wherein the voltage storage unit comprises a first transistor, a second transistor, a third transistor, a fourth transistor, and a first capacitor;

a gate of the first transistor is connected to the first node, and the first transistor is connected between the third signal terminal and a gate of the third transistor;

a gate of the second transistor is connected to the first clock terminal, and the second transistor is connected between the second signal terminal and the gate of the third transistor;

the third transistor is connected between the fourth signal terminal and a gate of the fourth transistor;

the fourth transistor is connected between the gate of the fourth transistor and the second node;

the first capacitor is coupled between the gate of the third transistor and the gate of the fourth transistor; and wherein the display panel comprises at least one of the following:

wherein a channel width-to-length ratio of the first transistor is F1, and a channel width-to-length ratio of the second transistor is F2, and wherein F1 is greater than F2; or, wherein a channel width-to-length ratio of the second transistor is F2, and a channel width-to-length ratio of the third transistor is F3, and wherein F2=F3.

2. The display panel according to claim 1, wherein the display panel comprises at least one of the following:

wherein the first-type shift register comprises a first trigger terminal, and the first trigger terminal is connected to an output terminal of a previous shift register of the plurality of shift registers, wherein the first-type shift register is located subsequent to the previous shift register;

or, wherein the first trigger terminal is also served as the first signal terminal.

3. The display panel according to claim 1, wherein the first node is connected to the second node.

4. The display panel according to claim 1, wherein the first-type shift register comprises a first reset unit, a node control unit, and a pull-down unit, the first reset unit is connected to a reset control terminal, a first power supply terminal, the second node, and the output terminal, and the first reset unit is configured to, in response to control of the reset control terminal, adjust the signal of the second node and the signal of the output terminal according to a signal of the first power supply terminal;

the node control unit is connected to the second node, the first power supply terminal, and the output terminal, and the node control unit is configured to, in response to the control of the second node, adjust the signal of the second node and the signal of the output terminal according to the signal of the first power supply terminal; and the pull-down unit is connected to a second trigger terminal, the second signal terminal, and the second node, and the pull-down unit is configured to, in response to control of the second trigger terminal, adjust the signal of the second node according to the signal of the second signal terminal.

5. The display panel according to claim 4, wherein the display panel comprises at least one of the following:

wherein the third signal terminal is also served as the reset control terminal; or, wherein the first power supply terminal is also served as the second signal terminal; or, wherein the first-type shift register comprises a second trigger terminal, and the second trigger terminal is connected to an output terminal of a next shift register of the plurality of shift registers, wherein the next shift register is located subsequent to the first-type shift register.

6. The display panel according to claim 1, wherein the first-type shift register comprises a first reset unit, a node control unit, and a pull-down unit;

the first reset unit comprises a fifth transistor and a sixth transistor, a gate of the fifth transistor is connected to a reset control terminal, the fifth transistor is connected between a first power supply terminal and the second node, a gate of the sixth transistor is connected to the reset control terminal, and the sixth transistor is connected between the first power supply terminal and the output terminal;

the node control unit comprises a seventh transistor, an eighth transistor, and a ninth transistor, a gate of the seventh transistor is connected to the second node, the seventh transistor is connected to the first power supply terminal and a fourth node, a gate of the eighth transistor is connected to the fourth node, the eighth transistor is connected between the first power supply terminal and the second node, a gate of the ninth transistor is connected to the fourth node, and the ninth transistor is connected between the first power supply terminal and the output terminal;

the pull-down unit comprises a tenth transistor, a gate of the tenth transistor is connected to a second trigger terminal, and the tenth transistor is connected between the second signal terminal and the second node; and the first-type shift register further comprises a second capacitor and a third capacitor, the second capacitor is coupled between the second node and the output terminal, and the third capacitor is coupled between the first clock terminal and the fourth node.

7. The display panel according to claim 6, wherein the display panel comprises at least one of the following:

wherein the node control unit further comprises an eleventh transistor, a gate of the eleventh transistor is connected to a second clock terminal, and the eleventh transistor is connected between the first power supply terminal and the output terminal; or, wherein capacitance of the second capacitor is higher than capacitance of the third capacitor; or, wherein capacitance of the second capacitor is higher than capacitance of the first capacitor; or, wherein a channel width-to-length ratio of the fifth transistor is F5, and a channel width-to-length ratio of the sixth transistor is F6; and wherein F5=F6; or, wherein a channel width-to-length ratio of the second transistor is F2, and a channel width-to-length ratio of the fifth transistor is F5; and wherein F2=F5; or, wherein a channel width-to-length ratio of the eighth transistor is F8, and a channel width-to-length ratio of the seventh transistor is F7; and wherein F8 is greater than F7.

8. The display panel according to claim 1, wherein the pull-up unit comprises a twelfth transistor, a gate of the twelfth transistor is connected to the first trigger terminal, and the twelfth transistor is connected between the first signal terminal and the first node; and the first output unit comprises a thirteenth transistor, a gate of the thirteenth transistor is connected to the second node, and the thirteenth transistor is connected between the first clock terminal and the output terminal.

9. The display panel according to claim 8, wherein the display panel comprises at least one of the following:

wherein a channel width-to-length ratio of the third transistor is F3, and a channel width-to-length ratio of the thirteenth transistor is F13; and wherein F3 is less than F13; or, wherein a channel width-to-length ratio of the fourth transistor is F4, and a channel width-to-length ratio of the twelfth transistor is F12; and wherein F4=F12.

10. The display panel according to claim 1, wherein the first-type shift register comprises a plurality of transistors; and the plurality of transistors are all N-type transistors, or the plurality of transistors are all P-type transistors.

11. The display panel according to claim 1, wherein at least one shift register of the plurality of shift registers is a second-type shift register; and the second-type shift register does not comprise a voltage storage unit.

12. A display panel, comprising:

a first drive circuit comprising a plurality of shift registers, wherein at least one shift register of the plurality of shift registers is a first-type shift register, and the first-type shift register comprises a pull-up unit, a voltage storage unit, and a first output unit;

the pull-up unit is connected to a first trigger terminal, a first signal terminal, and a first node;

the voltage storage unit comprises a first transistor, a second transistor, a third transistor, a fourth transistor, and a first capacitor, wherein a gate of the first transistor is connected to the first node, and the first transistor is connected between a third signal terminal and a gate of the third transistor; a gate of the second transistor is connected to a first clock terminal, and the second transistor is connected between a second signal terminal and the gate of the third transistor; the third transistor is connected between a fourth signal terminal and a gate of the fourth transistor; the fourth transistor is connected between the gate of the fourth transistor and a second node; and the first capacitor is coupled between the gate of the third transistor and the gate of the fourth transistor; and the first output unit is connected to the second node, the first clock terminal, and an output terminal;

wherein the first-type shift register further comprises a node control unit and a third capacitor;

the node control unit comprises a seventh transistor, an eighth transistor, and a ninth transistor, a gate of the seventh transistor is connected to the second node, the seventh transistor is connected to the first power supply terminal and a fourth node, a gate of the eighth transistor is connected to the fourth node, the eighth transistor is connected between the first power supply terminal and the second node, a gate of the ninth transistor is connected to the fourth node, and the ninth transistor is connected between the first power supply terminal and the output terminal;

the third capacitor is coupled between the first clock terminal and the fourth node;

wherein the first-type shift register further comprises an eleventh transistor; and a gate of the eleventh transistor is connected to a second clock terminal, and the eleventh transistor is connected between the first power supply terminal and the output terminal.

13. A display panel, comprising:

a first drive circuit comprising a plurality of shift registers, wherein at least one shift register of the plurality of shift registers is a first-type shift register, and the first-type shift register comprises a pull-up unit, a voltage storage unit, and a first output unit;

the pull-up unit is connected to a first trigger terminal, a first signal terminal, and a first node;

the voltage storage unit comprises a first transistor, a second transistor, a third transistor, a fourth transistor, and a first capacitor, wherein a gate of the first transistor is connected to the first node, and the first transistor is connected between a fourth signal terminal and a second node; a gate of the second transistor is connected to a first clock terminal, and the second transistor is connected between a second signal terminal and the first node; a gate of the third transistor is connected to a third signal terminal, and the third transistor is connected between the second node and a third node; a gate of the fourth transistor is connected to the first clock terminal, and the fourth transistor is connected between the second signal terminal and the third node; and the first capacitor is coupled between the third node and the first node; and the first output unit is connected to the second node, the first clock terminal, and an output terminal;

wherein the first-type shift register further comprises a node control unit and a third capacitor;

the node control unit comprises a seventh transistor, an eighth transistor, and a ninth transistor, a gate of the seventh transistor is connected to the second node, the seventh transistor is connected to a first power supply terminal and a fourth node, a gate of the eighth transistor is connected to the fourth node, the eighth transistor is connected between the first power supply terminal and the second node, a gate of the ninth transistor is connected to the fourth node, and the ninth transistor is connected between the first power supply terminal and the output terminal;

the third capacitor is coupled between the first clock terminal and the fourth node;

wherein the first-type shift register further comprises an eleventh transistor; and a gate of the eleventh transistor is connected to a second clock terminal, and the eleventh transistor is connected between the first power supply terminal and the output terminal.

* * * * *